(12) United States Patent
Wang et al.

(10) Patent No.: US 12,186,748 B2
(45) Date of Patent: Jan. 7, 2025

(54) SELF-PRIMING MICROFLUIDIC STRUCTURES

(71) Applicant: Hewlett-Packard Development Company, L.P., Spring, TX (US)

(72) Inventors: Peiyun Wang, Singapore (SG); Pavel Kornilovich, Corvallis, OR (US); Alexander Govyadinov, Corvallis, OR (US); Noorashekin Binte Jamil, Singapore (SG); Sarita Jairam, Singapore (SG); Jinghua Zhao, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 234 days.

(21) Appl. No.: 17/848,864

(22) Filed: Jun. 24, 2022

(65) Prior Publication Data

US 2023/0415151 A1    Dec. 28, 2023

(51) Int. Cl.
*B01L 3/00*      (2006.01)
*G01N 11/00*   (2006.01)

(52) U.S. Cl.
CPC ........ *B01L 3/502715* (2013.01); *G01N 11/00* (2013.01); *B01L 2200/0647* (2013.01); *B01L 2400/0406* (2013.01)

(58) Field of Classification Search
CPC ....... B01L 3/502715; B01L 2200/0647; B01L 2400/0406; B01L 2400/0688;

(Continued)

(56) References Cited

U.S. PATENT DOCUMENTS

| 5,837,115 A | 11/1998 | Austin et al. |
| 7,686,029 B2 | 3/2010 | Nakao |

(Continued)

FOREIGN PATENT DOCUMENTS

| CN | 1715932 B | * | 4/2012 | ........ B01L 3/502723 |
| CN | 203525731 U | | 4/2014 | |

(Continued)

OTHER PUBLICATIONS

Huang et al., The implementation of a thermal bubble actuated microfluidic chip with microvalve, micropump and micromixer, Sensors and Actuators A: Physical 210, 2014, pp. 147-156.

(Continued)

*Primary Examiner* — Robert R Raevis
(74) *Attorney, Agent, or Firm* — Foley & Lardner LLP

(57) ABSTRACT

An example self-priming microfluidic structure can include a microfluidic channel including a floor and a ceiling. A channel height is defined as a distance between the floor and the ceiling. A channel height step can be in the floor, or ceiling, or both. The channel height downstream of the channel height step can be greater than the channel height upstream of the channel height step. An interior pillar can be positioned in the microfluidic channel extending from the floor to the ceiling. The interior pillar can include a widening portion at an upstream end of the interior pillar and a tapering portion at a downstream end of the interior pillar. The interior pillar can overlap the channel height step so that the interior pillar is partially upstream of the channel height step and partially downstream of the channel height step.

15 Claims, 12 Drawing Sheets

(58) Field of Classification Search
CPC ........... B01L 2400/086; B01L 3/50273; G01N 11/00; B01J 2219/0027; B01J 2219/00369; B01J 2220/84; B01J 2220/86
USPC ......... 73/152.24, 54.04–54.6, 64.48, 864.02, 73/864.23; 422/412, 502–508, 520, 546, 422/924, 947; 137/246.23
See application file for complete search history.

(56) References Cited

U.S. PATENT DOCUMENTS

| | | | |
|---|---|---|---|
| 8,475,626 | B2 | 7/2013 | Rops et al. |
| 9,174,182 | B2 | 11/2015 | Wimberger-Friedl et al. |
| 9,771,553 | B2 | 9/2017 | Vulto et al. |
| 9,822,890 | B2 | 11/2017 | Juncker et al. |
| 2008/0259720 | A1 | 10/2008 | Lam et al. |
| 2010/0089529 | A1 | 4/2010 | Barholm-Hansen et al. |
| 2011/0086427 | A1 | 4/2011 | Faris et al. |
| 2015/0119280 | A1* | 4/2015 | Srinivas ............ B01L 3/502784 506/9 |
| 2015/0196909 | A1 | 7/2015 | Jones et al. |
| 2016/0136642 | A1 | 5/2016 | Eriksen et al. |
| 2016/0136643 | A1 | 5/2016 | Larson |
| 2016/0228873 | A1 | 8/2016 | Govyadinov et al. |
| 2016/0272934 | A1 | 9/2016 | Chander et al. |
| 2016/0279637 | A1 | 9/2016 | Sarioglu et al. |
| 2017/0333900 | A1 | 11/2017 | Grisham et al. |
| 2017/0355945 | A1 | 12/2017 | Kamm et al. |
| 2018/0029032 | A1 | 2/2018 | Govyadinov et al. |
| 2018/0272340 | A1 | 9/2018 | Govyadinov et al. |
| 2019/0060898 | A1 | 2/2019 | Mourey et al. |
| 2019/0226953 | A1 | 7/2019 | Wunsch et al. |
| 2020/0139408 | A1 | 5/2020 | Ito |
| 2020/0254407 | A1 | 8/2020 | Wilson et al. |
| 2022/0135399 | A1* | 5/2022 | Puebla Hellmann ........................ B01L 3/502715 422/503 |

FOREIGN PATENT DOCUMENTS

| | | | |
|---|---|---|---|
| CN | 107824105 | | 3/2018 |
| CN | 209906795 | | 1/2020 |
| EP | 1416303 | | 8/2010 |
| EP | 3675876 | | 7/2020 |
| EP | 3862090 A1 | * | 8/2021 ............ B01L 3/0203 |
| JP | 2011-072989 A | | 4/2011 |
| JP | 2021512310 A | * | 5/2021 |
| WO | 2008024070 | | 2/2008 |
| WO | 2014046687 | | 3/2014 |
| WO | 2014207257 | | 12/2014 |
| WO | WO-2014206420 A1 | * | 12/2014 ............ B01L 3/5027 |
| WO | WO-2016051272 A1 | * | 4/2016 ....... A61B 5/150022 |
| WO | 2020013915 | | 1/2020 |
| WO | WO-2021247750 A1 | * | 12/2021 ........ B01L 3/502707 |
| WO | 2022/159097 A1 | | 7/2022 |

OTHER PUBLICATIONS

Hayes et al., Pulsatory Mixing of Laminar Flow Using Bubble-Driven Micro-Pumps, Proceedings of the ASME 2018 International Mechanical Engineering Congress and Exposition, IMECE2018-86937, Nov. 9-15, 2018, Pittsburgh, USA, 8 pages.

Pompano et al., Control of Initiation, Rate, and Routing of Spontaneous Capillary-Driven Flow of Liquid Droplets through Microfluidic Channels on SlipChip, Langmuir, vol. 28, 2012, pp. 1931-1941.

* cited by examiner

SELF-PRIMING MICROFLUIDIC STRUCTURES

BACKGROUND

Microfluidics relates to the behavior, control and manipulation of fluids that are geometrically constrained to a small, typically sub-millimeter, scale. Numerous applications employ passive fluid control techniques such as capillary forces. Capillary action refers to the spontaneous wicking of fluids into narrow channels without the application of external forces. In other applications, external actuation techniques are employed for a directed transport of fluid. A variety of applications for microfluidics exists, with various applications using differing controls over fluid flow, mixing, temperature, evaporation, and so on.

DETAILED DESCRIPTION

Figure 1:
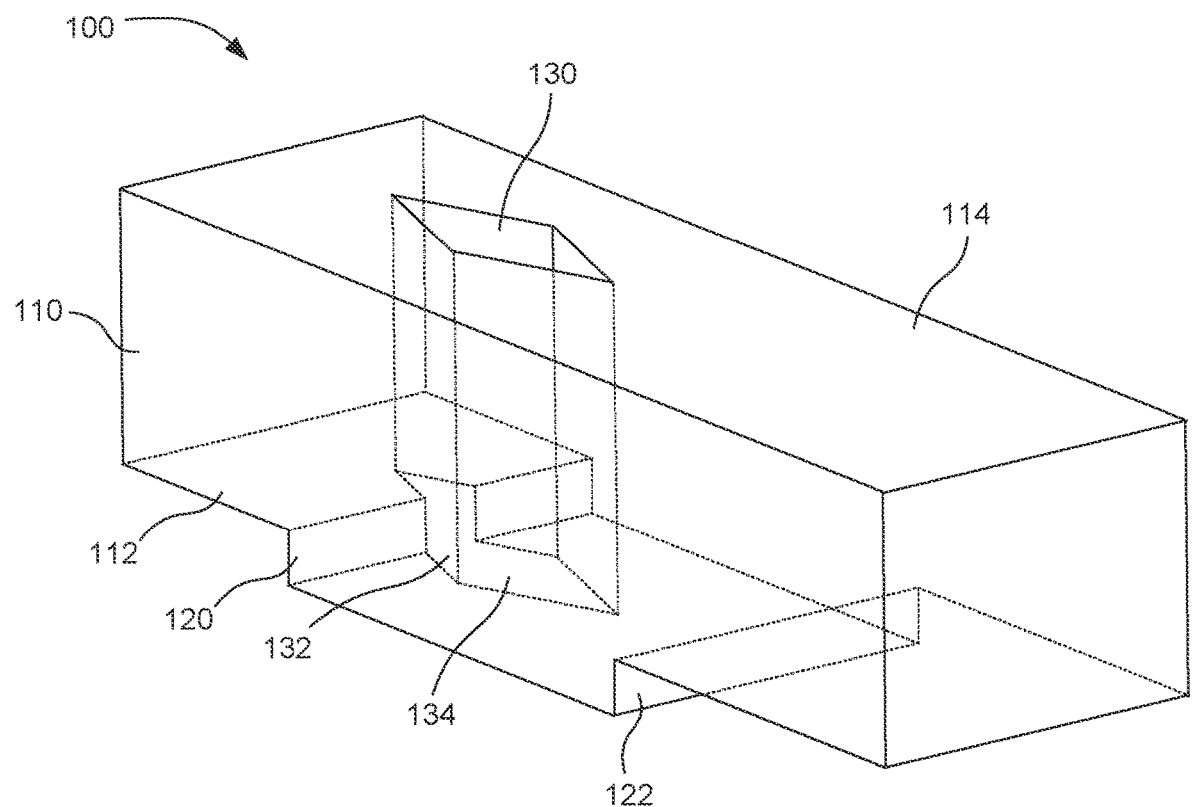
FIG. 1 is a perspective view of an example microfluidic structure in accordance with the present disclosure.

The present disclosure describes self-priming microfluidic structures and self-priming microfluidic junctions. The self-priming microfluidic structures include a channel height step where the height of a microfluidic channel increases suddenly. When the microfluidic channel is primed by capillary action, fluid can tend to become pinned at the channel height step. However, the self-priming microfluidic structures can also include an interior pillar that overlaps the channel height step, and the interior pillar can allow fluid to flow past the channel height step by capillary action.

The present disclosure sets forth self-priming microfluidic structures. In some examples, a self-priming microfluidic structure includes a microfluidic channel including a floor and a ceiling. The channel height is defined as the distance between the floor and the ceiling. A channel height step is in the floor, or ceiling, or both. The channel height downstream of the channel height step is greater than the channel height upstream of the channel height step. An interior pillar is positioned in the microfluidic channel and extends from the floor to the ceiling. The interior pillar includes a widening portion at an upstream end of the interior pillar and a tapering portion at a downstream end of the interior pillar. The interior pillar overlaps the channel height step such that the interior pillar is partially upstream of the channel height step and partially downstream of the channel height step. In some examples, the widening portion of the interior pillar can overlap the channel height step such that the widening portion is partially upstream of the channel height step and partially downstream of the channel height step. The widening portion of the interior pillar can have a wedge shape with an upstream edge having an angle from 1° to 160°. The tapering portion of the interior pillar can have a tapered downstream edge having an angle from 5° to 45°. In certain examples, the microfluidic channel can include an angled sidewall portion that reduces a channel width of the microfluidic channel at the channel height step compared to the channel width of the microfluidic channel upstream of the angled sidewall portion. In other examples, the microfluidic structure can include a thermal resistor on the floor downstream of the channel height step. The microfluidic channel can be formed in multiple stacked layers of photoresist material, wherein the channel height step includes a layer of the multiple stacked layers having a void space formed therein downstream of the channel height step, wherein the layer is solid upstream of the channel height step, and wherein the layer is the floor or ceiling of the microfluidic channel upstream of the channel height step.

The present disclosure also describes self-priming microfluidic junctions. In some examples, a self-priming microfluidic junction includes a first microfluidic channel including a floor and a ceiling. The channel height is defined as the distance between the floor and ceiling. A channel height step is in the floor, or ceiling, or both. The channel height downstream of the channel height step is greater than the channel height upstream of the channel height step. An interior pillar is positioned in the first microfluidic channel and extends from the floor to the ceiling. The interior pillar includes a widening portion at an upstream end of the interior pillar and a tapering portion at a downstream end of the interior pillar. The interior pillar overlaps with the channel height step such that the interior pillar is partially upstream of the channel height step and partially downstream of the channel height step. The self-priming microfluidic junction also includes a second microfluidic channel joining the first microfluidic channel at a capillary break opening in a wall of the first microfluidic channel. The capillary break opening is positioned downstream of the channel height step. The capillary break opening has a height that is less than the channel height of the first microfluidic channel downstream of the channel height step.

In some examples, the widening portion of the interior pillar can overlap the channel height step such that the widening portion is partially upstream of the channel height step and partially downstream of the channel height step. The widening portion of the interior pillar can have a wedge shape with an upstream edge having an angle from 1° to 160°. The tapering portion of the interior pillar can have a tapered downstream edge having an angle from 5° to 45°. In certain examples, the first microfluidic channel can include an angled sidewall portion that reduces a channel width of the first microfluidic channel at the channel height step compared to the channel width of the first microfluidic channel upstream of the angled sidewall portion. The first microfluidic channel and the second microfluidic channel can be formed in multiple stacked layers of photoresist material, wherein the channel height step includes a layer of the multiple stacked layers having a void space formed therein downstream of the channel height step, wherein the layer is solid upstream of the channel height step, and wherein the layer is the floor or ceiling of the first microfluidic channel upstream of the channel height step.

The present disclosure also describes methods of priming a microfluidic structure. In some examples, a method of priming a microfluidic structure includes providing a microfluidic channel including a floor and a ceiling, wherein a channel height is defined as a distance between the floor and the ceiling, wherein the channel height increases, in a fluid flow direction through the microfluidic channel, at a channel height step in the floor, or ceiling, or both, wherein an interior pillar is positioned in the microfluidic channel and extends from the floor to the ceiling, wherein the interior pillar includes a widening portion at an upstream end of the interior pillar and a tapering portion at a downstream end of the interior pillar, wherein the interior pillar overlaps the channel height step such that the interior pillar is partially upstream of the channel height step and partially downstream of the channel height step. A fluid flows through the microfluidic channel in the fluid flow direction by capillary action. The fluid flows past the interior pillar and the channel height step by capillary action. In some examples, the microfluidic channel can be a first microfluidic channel and the fluid can be a second fluid. The method can also include introducing a first fluid into a second microfluidic channel, wherein the second microfluidic channel joins the first microfluidic channel at a capillary break opening in a wall of the first microfluidic channel, wherein the capillary break opening is positioned downstream of the channel height step, and wherein the capillary break opening has a height that is less than the channel height of the first microfluidic channel downstream of the channel height step. The first fluid can flow through the second microfluidic channel by capillary action. The first fluid can stop in the capillary break opening, and the first fluid can form a meniscus at the capillary break opening before the second fluid flows past the channel height step. The second fluid can merge with the meniscus of the first fluid as the second fluid flows past the capillary break opening. A combination of the first fluid and the second fluid can flow by capillary action through the first microfluidic channel downstream of the capillary break opening. In some examples, the fluid can have a contact angle greater than 70° with a material of the floor, ceiling, or walls of the first microfluidic channel.

In these examples, it is noted that when discussing the self-priming microfluidic structures, the self-priming microfluidic junctions, and/or the methods of the present disclosure, any such discussions can be considered applicable to the other examples, whether or not they are explicitly discussed in the context of that example. Thus, for example, in discussing details about an interior pillar of the self-priming microfluidic structures, such discussion also relates to the self-priming microfluidic junctions and/or methods described herein, and vice versa.

Self-Priming Microfluidic Structures

The microfluidic structures described herein can be incorporated into a variety of microfluidic devices. Microfluidic devices are widely used in life sciences and other applications. These devices typically include small microfluidic fluid flow channels having dimensions on the scale of microns, such as channels having a width or height of less than 1000 µm, or less than 500 µm, or less than 100 µm, or less than 50 µm, or less than 20 µm, in various examples. At such small scales, certain forces such as adhesive and cohesive forces, fluids can become more significant compared to larger scales. For example, the behavior of water in microfluidic channels can be largely dictated by the adhesive forces of the water adhering to hydrophilic solid surfaces, and by the cohesive forces between water molecules, which may manifest as surface tension. Because the volume of water within a small microfluidic channel can be very small, the forces of gravity on the water may be less significant or negligible compared to adhesive and cohesive forces. When the solid wall surfaces of a microfluidic channel are hydrophilic, the adhesive forces between water and the microfluidic channel walls can cause water to spontaneously flow into the microfluidic channel by capillary action. This can occur regardless of the orientation of the microfluidic device, since the force of gravity on the water may be negligible.

When a solid material has a strong adhesion with water, the solid material can be said to have a low contact angle with water. The contact angle refers to the angle between a solid surface and a surface of a water droplet at the interface between the droplet surface and the solid surface. When the solid material is more hydrophilic, the contact angle becomes more acute because the water droplet tends to spread out over the surface more. Solid materials that have a contact angle with water of less than 90° are considered to be hydrophilic, and materials that have a contact angle with water greater than 90° are considered to be hydrophobic. The contact angle between a fluid and a solid material can depend on both the fluid and on the solid material. For example, a particular solid material may have a higher contact angle with pure water, but a lower contact with water that has a wetting agent added.

Some microfluidic devices can be manufactured and packaged in a dry state. In this state, microfluidic channels within the device may contain air instead of liquid. When the device is used, the microfluidic channels can be primed, meaning a liquid can be introduced into the microfluidic channels. It can be useful to prime the microfluidic channels through capillary action instead of using an external force such as a pump to force the liquid into the microfluidic channels. In order for the microfluidic channels to be capable of self-priming by capillary action, the microfluidic channels can be designed so that the adhesive forces between the liquid and the walls of the microfluidic channels overcomes the cohesive forces between water molecules. In other words, the liquid will preferentially continue to flow through the microfluidic channels because the adhesive attraction to the walls of the channels instead of being held stationary by cohesive forces such as surface tension.

In some cases, any sudden increases in the cross-sectional area of a microfluidic channel may potentially cause the capillary action to stop, because the cohesive forces of the liquid will tend to prevent the liquid-air interface (i.e., the meniscus) from growing to fill the larger cross-section. A sudden increase in the cross-sectional area of the channel can cause the meniscus to become convex, which can create a positive capillary pressure and stop fluid advancement. One type of feature that causes such a break in capillary action is a channel height step. A channel height step can be a step formed in the floor of a microfluidic channel, or in the ceiling of a microfluidic channel, or both. For example, the floor can step down suddenly to a lower elevation, or the ceiling can step up to a higher elevation. The sudden increase in the height of the channel can cause liquid to stop flowing by capillary action at the channel height step. Liquids that have a higher contact angle, such as 70° or greater, can be especially likely to stop flowing at such a channel height step. A channel height step in a long microfluidic channel with a high fluid resistance is also more likely to cause fluid to stop flowing.

One method of manufacturing microfluidic devices involves forming two-dimensional features in flat layers of material, such as layers of photoresist. The features can include microfluidic channels and other microfluidic flow features. Such features can be formed in a layer of photoresist material by a patterning process such as photolithography. This type of manufacturing process allows for a high level control over the shape of the microfluidic channels in two dimensions. However, this process does not allow full control of the shape in the third dimension, which is the height or elevation dimension (i.e., up and down). Additional layers of photoresist material can be deposited over the top of the first layer of photoresist. These additional layers can include differently shaped and located microfluidic channels and other structures. Thus, this provides some control over the shape of microfluidic structures in the height dimension, but full control over the height dimensional may not be available with this manufacturing process. This can be referred to as a "2.5 dimensional process."

In some designs for microfluidic devices, a bottom layer of photoresist material can form the floor of a microfluidic channel. In certain examples, this bottom layer is a relatively thin layer of photoresist that is deposited over a solid substrate as a primer layer. However, the primer layer may include cut-outs, which can be openings or void spaces formed in the primer layer for various purposes. For example, some microfluidic devices can include thermal resistors formed as a layer of resistive material on the substrate. Thermal resistors can be used as heaters to heat liquid in the microfluidic channel, or as bubble generators to generate vapor bubbles to eject droplets of liquid from an ejection nozzle or to pump liquid through the microfluidic channel. An area of the primer layer can be cut out over the thermal resistor to allow the resistor to heat the liquid in the channel more effectively. However, since the primer layer may be the floor of a microfluidic channel, the cut out in the primer layer forms a channel height step where the floor of the channel suddenly steps down in elevation. This channel height step can cause fluid pinning as explained above. Cut outs can also be formed in the primer layer for other purposes, and/or other layers can include features that create channel height steps such as step-ups in the ceiling of a microfluidic channel.

The present disclosure describes microfluidic structures that include a channel height step, but which also can be self-priming by capillary action, without fluid becoming pinned at the channel height step. This can be accomplished by placing an interior pillar in the microfluidic channel overlapping the channel height step. As used herein, "overlapping the channel height step" means that the pillar is positioned so that part of the pillar is upstream of the channel height step and part of the pillar is downstream of the channel height step. Thus, the pillar straddles both sides of the channel height step. The pillar is referred to as an "interior pillar" because the pillar is located within the microfluidic channel. The pillar can be spaced apart from the sidewalls of the microfluidic channel. Thus, fluid flowing through the microfluidic channel can flow around the pillar on two sides of the pillar, e.g., the right side and left side of the pillar. An interior pillar that overlaps the channel height step can increase the wall surface area at the channel height step. This can increase the influence of forces of adhesion between the fluid and the walls, which can promote capillary action. Thus, the presence of the interior pillar can cause fluid to flow past the channel height step by capillary action even if the fluid would have been pinned at the channel height step if the interior pillar was not present.

In some examples, the interior pillar can have a widening portion at the upstream end of the interior pillar and the widening portion can overlap the channel height step. As used herein "widening portion" refers to a portion of the pillar that increases in width with respect to the direction of fluid flow. Because the pillar increases in width in the fluid flow direction, the cross-sectional area available for fluid flow shrinks as fluid flows past the widening portion. This shrinking of the cross-sectional area can help to counteract the sudden increase in cross-sectional area that occurs at the channel height step. The widening portion of the pillar can also form various acute angles with walls of the channel and the channel height step itself. These acute angles can attract fluid because of the forces of adhesion between the fluid and the walls. Therefore, the widening portion of the pillar can also help to promote flow by capillary action and prevent fluid from becoming pinned at the channel height step.

In further examples, the interior pillar can have a tapering portion at a downstream end of the pillar. As used herein, "tapering portion" means that the width of the pillar decreases with respect to the fluid flow direction. Thus, when fluid flows past the tapering portion, the cross-sectional area available for fluid flow increases as the width of the pillar decreases. This tapering portion at the downstream end can be useful because if the pillar had a flat, non-tapering downstream end, then the downstream end of the pillar could cause fluid pinning. As explained above, fluid pinning can occur when the cross-sectional area of the channel increases suddenly. The tapering downstream end of the pillar can allow the fluid cross-sectional area to increase gradually so that fluid pinning does not occur.

FIG. 1 shows one example microfluidic structure 100 in accordance with the present disclosure. The microfluidic structure includes a microfluidic channel 110 with a floor 112 and a ceiling 114. The channel height is defined as the distance between the floor and the ceiling. A channel height step 120 is in the floor of the microfluidic channel. In this example, the floor drops down so that the channel height downstream of the channel height step is greater than the channel height upstream of the channel height step. An interior pillar 130 is positioned in the microfluidic channel. The interior pillar extends from the floor to the ceiling. The interior pillar includes a widening portion 132 at the upstream end of the interior pillar and a tapering portion 134 at the downstream end of the interior pillar. The interior pillar overlaps the channel heights step so that the interior pillar is partially upstream of the channel height step and partially downstream of the channel height step. In this example, the widening portion of the interior pillar overlaps with the channel height step so that the widening portion is partially upstream of the channel height step and partially downstream of the channel height step. In this example, a second channel height step 122 is downstream of the first channel height step and the interior pillar. At the second channel height step, the channel floor steps back up to its original height. There is no interior pillar at the second channel height step, because the fluid cross-sectional area decreases at the second channel height step. Sudden decreases in fluid cross-sectional area do not cause fluid pinning.

Figure 2:
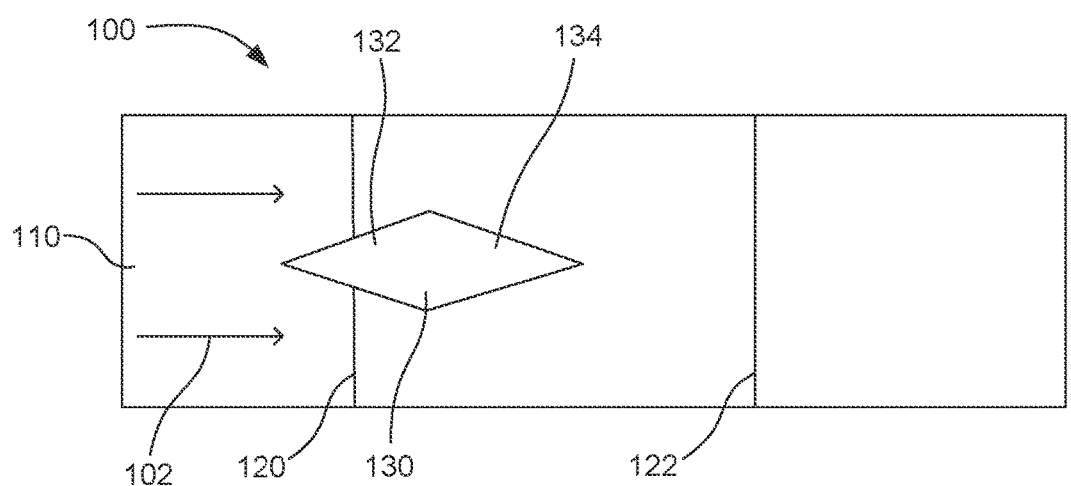
FIG. 2 is a top-down view of the example microfluidic structure from FIG. 1.

FIG. 2 shows a top-down view of the example microfluidic structure 100 in FIG. 1. The fluid flow direction is shown by arrows 102. As fluid flows along the microfluidic channel 110, the fluid flows past the widening portion 132 at the upstream end of the interior pillar 130. The widening portion overlaps with the channel height step 120. In this example, the interior pillar has its widest portion downstream of the channel height step. The fluid flows past this point, and then begins to flow past the tapering portion 134 of the interior pillar. The tapering portion is designed to gradually increase the fluid cross-sectional area so that the pillar does not cause fluid pinning. The fluid cross-sectional area decreases at the second channel height step 122, so the fluid can flow past the second channel height step without becoming pinned.

The top-down view shown in FIG. 2 shows that the features of the microfluidic structure can have shapes formed in two dimensions, such as by a two-dimensional patterning process. In some examples, the microfluidic structures described herein can be made from multiple stacked layers of material, and the individual layers can be patterned using a two-dimensional patterning process. In certain examples, the layers can be layers of photoresist material that has been patterned using photolithography. The two-dimensional shapes of features in these layers can be controlled with high accuracy and resolution. Thus, the diamond shape of the interior pillar in FIG. 2 can be formed using the two-dimensional patterning process. However, these process do not provide full control over the shape of features in the third dimension. This third dimension can be referred to as the "z-axis" dimension or the "height" dimension. The two dimensions that can be controlled by the two-dimensional patterning process can be referred to as the "x-axis" and "y-axis" dimensions. One of these dimensions can be the "width" direction with respect to the microfluidic channel and the other can be the "length" direction with respect to the microfluidic channel.

It is noted that the microfluidic structures described herein can be oriented in any desired orientation and the orientation of the structures and components of the structures is not limited by terms such as "up," "above," "vertical," "horizontal," etc. However, for clarity in describing the microfluidic structures, the geometry of the structures is described herein in relation to the coordinate axis. Therefore, any reference to height, the vertical direction, up, down, etc., can refer to differences on the z-axis. The z-axis direction is the direction in which a microfluidic structure is built up by stacking additional layers of material. Structures that lie along the x-axis, the y-axis, or the x-y plane can be described as horizontal. As used herein, "elevation plane" refers to a plane in or parallel to the x-y plane. In other words, an elevation plane is a plane that is orthogonal to the z-axis.

Figure 3A:
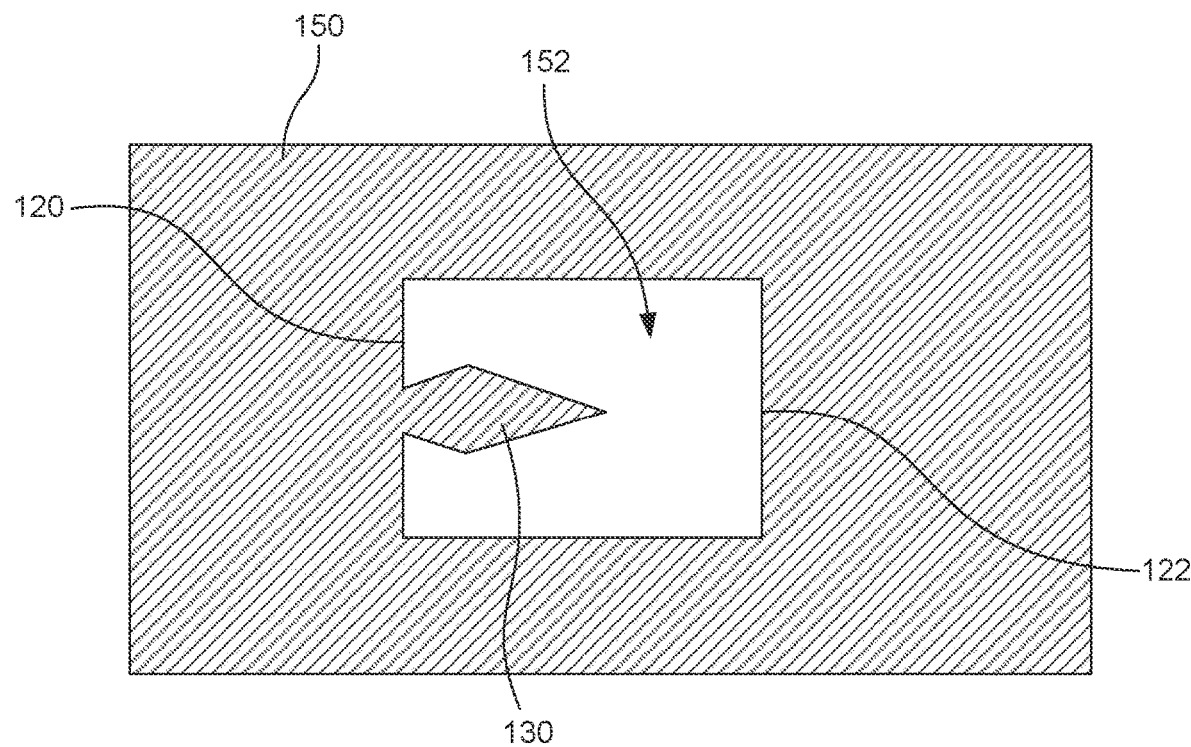
FIGS. 3A and 3B are top-down views of layers of solid material that can be stacked to form the microfluidic structure of FIG. 1.
Figure 3B:
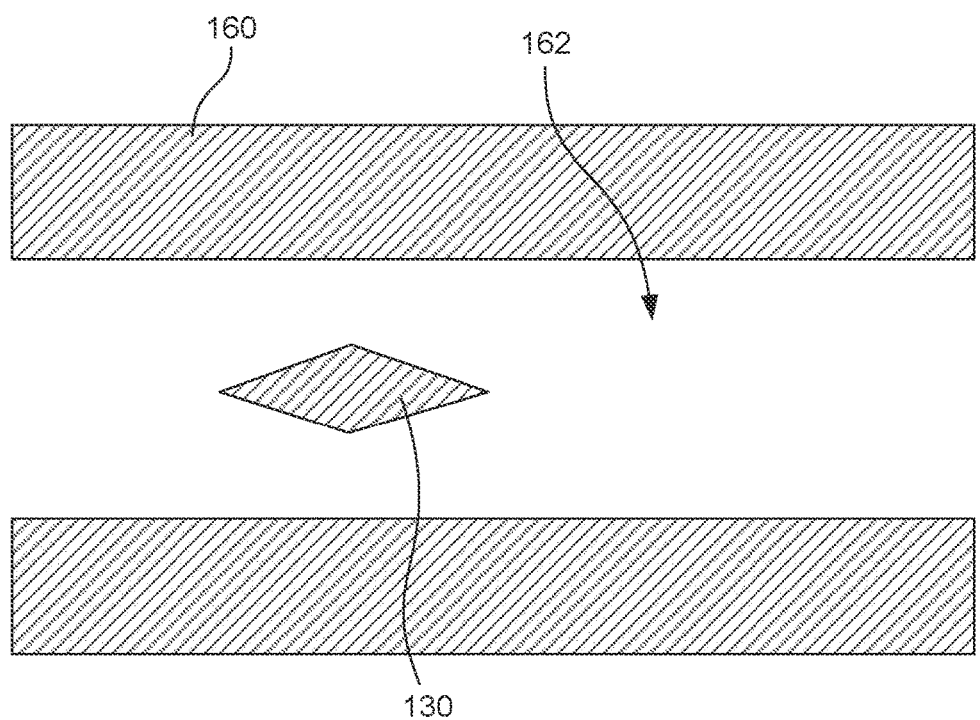

FIGS. 3A and 3B show examples of layers of solid material that can be stacked to form the example microfluidic structure shown in FIG. 1 and FIG. 2. FIG. 3A shows a first layer 150 of solid material that includes a cutout 152. This cutout forms the lower area of the channel floor in the example microfluidic structure. The upstream end of this cutout forms the channel height step 120, where the floor drops suddenly and the channel height increases. The downstream end of the cutout forms the second channel height step 122, where the floor steps back up to its original height. The first layer of solid material also includes a solid portion of the interior pillar 130. This portion forms the bottom layer of the interior pillar when the layers are stacked. FIG. 3B shows a second layer 160 of solid material. This layer includes a channel cutout 162 that forms the side walls of the microfluidic channel. The shape of the interior pillar 130 is also left as a solid portion in this layer.

The interior pillar can have a variety of shapes as long as the interior pillar helps fluid to flow over the channel height step by capillary action and as long as the interior pillar does not cause fluid pinning due to its shape. As mentioned above, the interior pillar can include a widening portion at the upstream end. In some examples, the widening portion can have a wedge shape, with an angled upstream edge. The upstream edge can have an angle in the x-y plane, where the angle is from 1° to 160°. In further examples, the upstream edge can have an angle from 10° to 100°, or from 15° to 90°, or from 20° to 60°. The widening portion can also have other shapes, such as a polygonal shape or a rounded shape.

The interior pillar can also have a tapered portion at its downstream end. The tapered portion can end at an angled downstream edge having an angle from 5° to 45°, or from 5° to 30°, or from 10° to 30°, or from 20° to 30°, or from 20° to 45°. In other examples, the tapering portion can have a rounded shape.

The angles of the pillar can be selected so that fluid will flow by capillary action around the pillar and over the channel height step. In some cases, certain angles may allow for fluid to flow in this way while other angles may cause fluid pinning. The specific angles that can allow for fluid flow can depend on the specific geometry of the microfluidic structure and the contact angle of the fluid with the solid material of the microfluidic structure. In some examples, the fluid can have a contact angle from 70° to 89°, or from 70° to 85°, or from 70° to 80°, or from 70° to 75°, or from 75° to 80°, or from 75° to 85° with the solid material of the microfluidic structure.

The faces of the interior pillar, including angled faces that may make up the widening portion and the tapering portion, can be vertical wall segments in some examples, meaning that the wall segment extends straight up and down, without being angled with respect to the z-axis. This can be due to the process used to form the layers of the microfluidic structure. As explained above, in some examples the process can allow for control over two-dimensional shapes in the layers but not control over shapes in the z-axis direction. It is noted that some processes can allow a small degree of control over the z-axis direction. For example, the wall segments can be made with slight angles, such as 15° or less, in the z-axis direction. Therefore, wall segments in the microfluidic structures described herein may not be perfectly vertical and may have such slight angles in some examples. However, the microfluidic structure designs described herein do not rely on forming angles in the z-axis direction in order to provide self-priming capillary structures.

Figure 4:
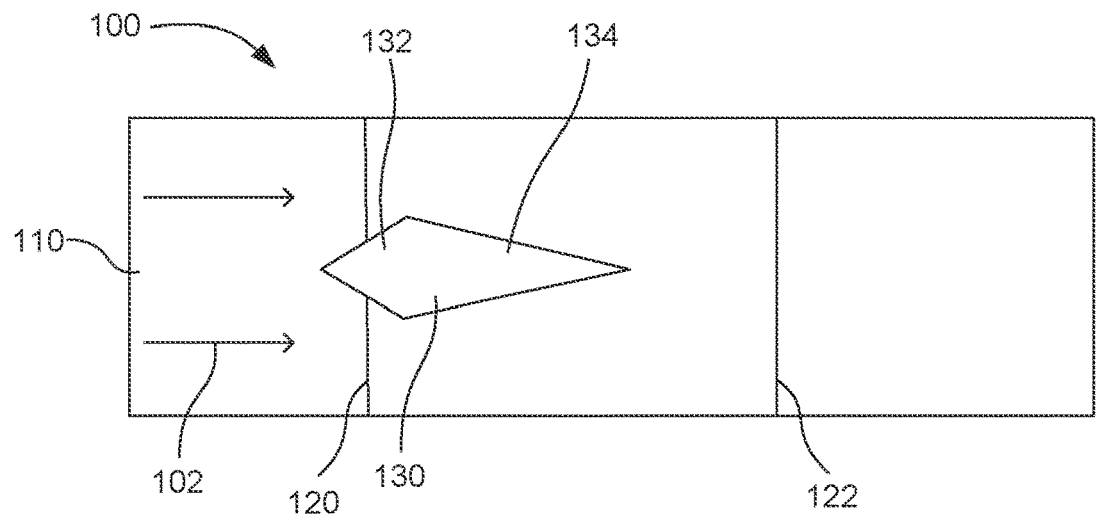
FIG. 4 is a top-down view of another example microfluidic structure in accordance with the present disclosure.
Figure 5:
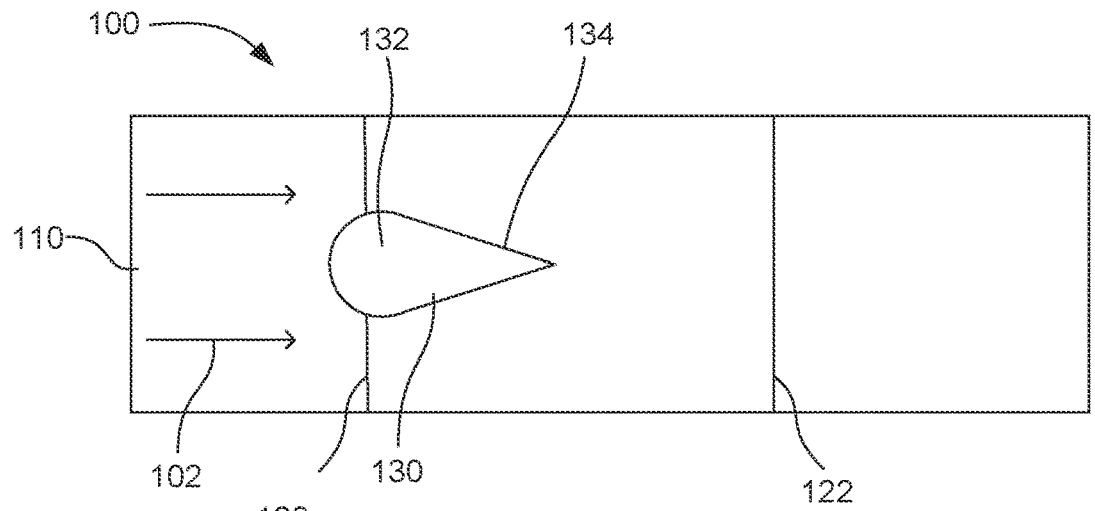
FIG. 5 is a top-down view of another example microfluidic structure in accordance with the present disclosure.
Figure 6:
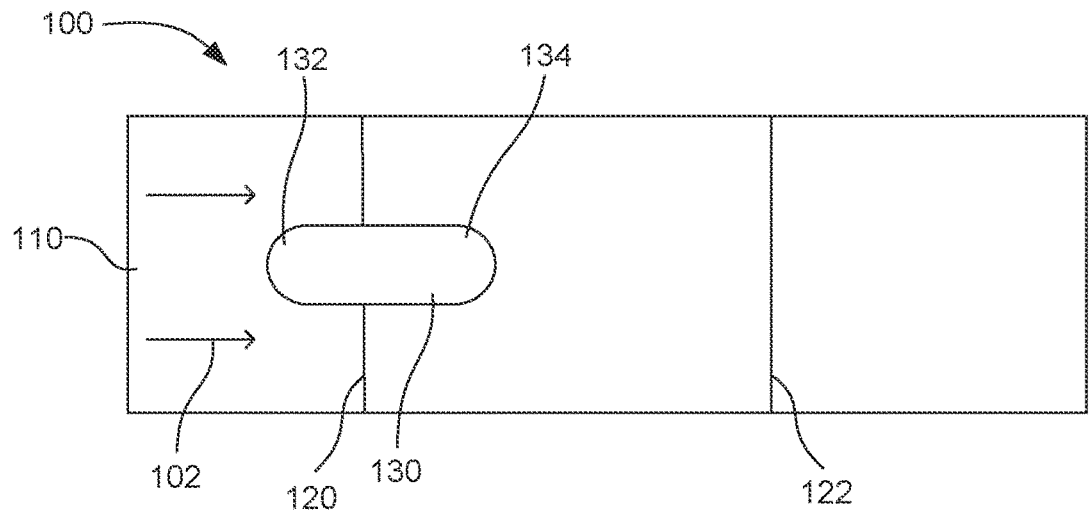
FIG. 6 is a top-down view of yet another example microfluidic structure in accordance with the present disclosure.

FIGS. 4-6 show top down views of additional example microfluidic structures with different interior pillar shapes. FIG. 4 shows a microfluidic structure 100 that includes an asymmetrical diamond-shaped interior pillar 130. This pillar is asymmetrical because it has a widening portion 132 with a larger angle and a tapering portion 134 with a smaller angle.

FIG. 5 shows another example microfluidic structure 100 that includes a teardrop-shaped interior pillar 130. This interior pillar has a widening portion 132 and a tapering portion 134 like the other interior pillar designs. However, the widening portion of this interior pillar is rounded instead of wedge-shaped. Thus, the widening portion does not have a sharp angle at the upstream edge. In this example, the widening portion still overlaps with the channel height step 120.

FIG. 6 shows another example microfluidic structure 100. The interior pillar 130 in this design has a rounded widening portion 132 and a rounded tapering portion 134. Thus, neither end of the pillar has a sharp angle. Additionally, this pillar is positioned so that the widening portion of the pillar does not overlap with the channel height step 120. Instead, a middle portion of the pillar overlaps with the channel height step. The middle portion in this example is not widening or tapering, but has two parallel sides. The examples shown in FIGS. 4-6 also include other features described above, including the arrows 102 showing the fluid flow direction, the microfluidic channel 110, and the second channel height step 122.

Figure 7:
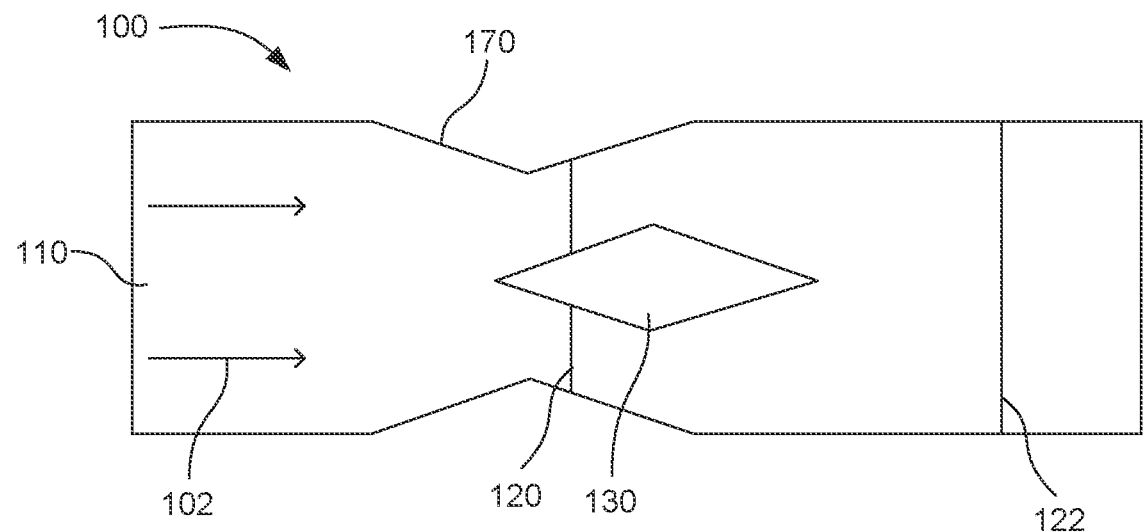
FIG. 7 is a top-down view of another example microfluidic structure in accordance with the present disclosure.

The microfluidic structures can also include other structures that narrow the cross-sectional area of the microfluidic channel, in addition to the interior pillar. In some examples, the sidewalls of the microfluidic channel can include an angled sidewall portion that angles inward to reduce the width of the microfluidic channel. This angled sidewall portion can be positioned at the channel height step so that the width of the microfluidic channel is reduced at the channel height step, compared to the normal width of the microfluidic channel upstream of the angled sidewall portion. FIG. 7 shows an example microfluidic structure 100 that includes angled sidewall portions 170 on both sidewalls of the microfluidic channel 110. These angled sidewall portions reduce the width of the channel at the channel height step 120. The angled sidewall portions in this example include a flat angled portion that angles inward and then another flat angled portion that angles back outward to the original width of the microfluidic channel. These angled sidewall portions can also be referred to as "triangular pillars" that are integrated in the sidewalls of the microfluidic channel. The inwardly-angled portions can form an angle from 1° to 60° with the sidewalls in some examples. In further examples, the angle can be from 5° to 45°, or from 10° to 40°, or from 15° to 30°. The outwardly angled portions can also form any of these angles with the sidewalls. In other examples, the angled sidewall portions can have a variety of other shapes. For example, the angled sidewall portions can be rounded instead of having flat angled portions as in this example. This example also includes a diamond-shaped interior pillar 130 that overlaps with the channel height step, and a second channel height step 122, and arrows 102 showing the direction of fluid flow as in previous examples.

The dimensions of the microfluidic channel and other features of the microfluidic structure can vary as long as the dimensions are small enough for flow to occur by capillary action. In some examples, the microfluidic channel can have a channel height from 2 μm to 100 μm upstream of the channel height step, or from 5 μm to 80 μm, or from 10 μm to 50 μm, or from 10 μm to 30 μm, or from 10 μm to 20 μm, or from 20 μm to 50 μm, or from 20 μm to 80 μm. The channel height can increase at the channel height step. Downstream of the channel height step, the channel height can be from 1 μm to 20 μm greater than the channel height upstream of the channel height step, or from 1 μm to 15 μm, or from 1 μm to 10 μm, or from 1 μm to 5 μm greater than the channel height upstream of the channel height step.

The width of the microfluidic channel can vary, as long as flow can occur by capillary action through the microfluidic channel. In various examples, the microfluidic channel can have a width from 5 μm to 200 μm, or from 10 μm to 150 μm, or from 10 μm to 100 μm, or from 10 μm to 80 μm, or from 15 μm to 60 μm, or from 20 μm to 45 μm, or from 20 μm to 100 μm. If the microfluidic channel includes angled sidewall portions that reduce the width of the channel, the reduced width can be from 30% to 99% of the original channel width, or from 40% to 98%, or from 50% to 95%, or from 60% to 90%, of the original channel width.

The dimensions of the interior pillars can also vary. In some examples, the interior pillars can have a width from 2 μm to 80 μm, or from 2 μm to 50 μm, or from 2 μm to 30 μm, or from 2 μm to 20 μm, or from 10 μm to 80 μm, or from 10 μm to 50 μm, or from 10 μm to 30 μm. The interior pillars can have a length from 10 μm to 200 μm, or from 10 μm to 120 μm, or from 10 μm to 80 μm, or from 30 μm to 100 μm, or from 30 μm to 80 μm, or from 30 μm to 60 μm. In some examples, the width of the interior pillar can be from 20% to 80% of the width of the microfluidic channel, or 20% to 60%, or 20% to 50%, or 20% to 40%, or 40% to 80%, or 40% to 60%, or 50% to 80% of the width of the microfluidic channel.

As mentioned above, the microfluidic structures can be made by stacking layers of material that have two-dimensional features formed in the individual layers. In certain examples, the microfluidic structure can be made by stacking a first layer and a second layer, such as shown in FIGS. 3A and 3B. The relative thickness of the first layer and the second layer can vary. As shown in FIG. 1, the first layer can have a smaller thickness than the second layer, which can make the channel height step relatively small compared to the total channel height. In some examples, the first layer can have a thickness from 1 μm to 20 μm, or from 1 μm to 10 μm, or from 1 μm to 6 μm, or from 1 μm to 4 μm, while the second layer can have a thickness from 10 μm to 100 μm, or from 10 μm to 80 μm, or from 10 μm to 50 μm, or from 10 μm to 30 μm, or from 10 μm to 20 μm.

In some examples, the layers that are stacked can initially be formed as individual layers of solid material and portions of the layers can be removed to form the microfluidic channel segments. The layers can then be stacked together and adhered together by curing, or by adhesive, or by fusing, or some other method. However, in other examples, the layers may not be formed as individual solid layers before being stacked together in this way. For example, a liquid photoresist material can be spread in a layer and then patterned and developed to form a solid layer having any desired microfluidic features formed therein. Another layer of liquid photoresist material can then be spread on the first layer, and the process of patterning and developing can be repeated to form additional layers. Thus, the layers can be formed one on another. In further examples, combinations of curable liquid material and solid material can be used. A variety of methods can be used to deposit layers of liquid photoresist material, such as spin coating, casting, spray coating, dip coating, and others.

In some examples, any of the layers of the microfluidic structures can be formed from a photoresist such as SU-8 or SU-8 2000 photoresist, which are epoxy-based negative photoresists. Specifically, SU-8 and SU-8 2000 are Bisphenol A Novolac epoxy-based photoresists that are available from various sources, including MicroChem Corp. These materials can be exposed to UV light to become crosslinked, while unexposed portions that are unexposed remain soluble in a solvent and can be washed away to leave voids.

In some examples, the microfluidic structures can be formed on a substrate such as a silicon material. For example, the substrate can be formed of single crystalline silicon, polycrystalline silicon, gallium arsenide, glass, silica, ceramics or a semiconducting material. In a particular example, the substrate can have a thickness from about 200 µm to about 1200 µm.

In further examples, a primer layer can be deposited on the substrate. The primer layer can be the "first layer" described above in some examples. In certain examples, the primer layer can be a layer of a photoresist material, such as SU-8, with a thickness from about 1 µm to about 10 µm.

In certain examples, layers of the microfluidic structures can be formed by laminating a dry film photoresist over the layer below and then exposing the dry film photoresist with a UV pattern defining any microfluidic features to be formed in that layer. In further examples, an additional ceiling or cap layer can be laminated over the top of the patterned layers, forming a ceiling for the microfluidic channel.

Figure 8:
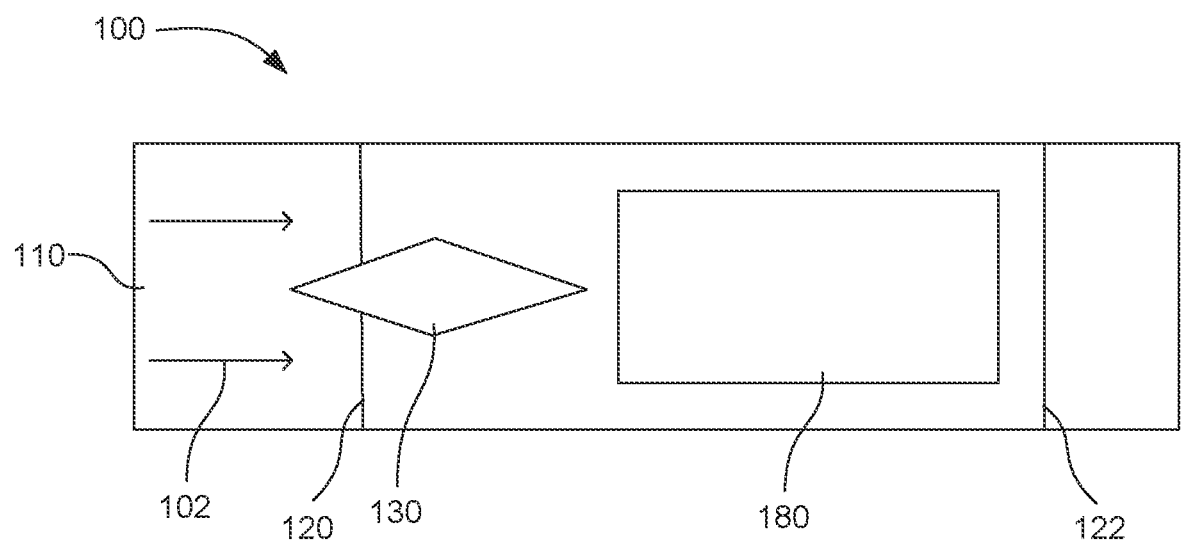
FIG. 8 is a top-down view of still another example microfluidic structure in accordance with the present disclosure.

As explained above, the channel height step can be a result of forming a cutout or void space in one of the layers of material. The cutout can be in the channel floor or the channel ceiling, or both. In some examples, the reason for forming this cutout can be to expose a component such as a thermal resistor. A thermal resistor can be positioned downstream of the channel height step, and the thermal resistor can be on the floor of the microfluidic channel in some examples. FIG. 8 shows a top-down view of an example microfluidic structure 100 that includes a thermal resistor 180 on a floor of the microfluidic channel 110 downstream of the channel height step 120. The thermal resistor is also upstream of the second channel height step 122. In this example, the portion of the bottom layer between the channel height step and the second channel height step is cut out to expose the thermal resistor to fluid in the channel. This example also includes a diamond-shaped interior pillar 130 overlapping with the channel height step. The direction of fluid flow is shown by arrows 102. In this example, the thermal resistor is positioned downstream of the interior pillar so that the interior pillar does not overlap with the thermal resistor. However, in other examples the interior pillar can overlap and form partially over the top of the thermal resistor. In such examples, part of the thermal resistor can be exposed to fluid in the microfluidic channel and part of the thermal resistor can be covered by the interior pillar.

Self-Priming Microfluidic Junctions

Microfluidic junctions are one specific type of self-priming microfluidic structures that can be made using the designs described above. A microfluidic junction can include two microfluidic channels that meet to combine fluids from both of the microfluidic channels. In some examples, a microfluidic junction can include a first microfluidic channel that has a channel height step and an interior pillar overlapping the channel height step as described above. The microfluidic junction can also include a second microfluidic channel that joins the first microfluidic channel at a location downstream of the channel height step. The second microfluidic channel can be connected to the first microfluidic channel through a capillary break opening, which can be an opening that has a smaller cross-sectional area compared to the fluid cross-sectional area that fluid would have after flowing out of the opening and into the first microfluidic channel. Thus, fluid can flow through the second microfluidic channel until the fluid reaches the capillary break opening. Capillary forces can then keep fluid pinned in the capillary opening so that the fluid does not flow out into the first microfluidic channel. However, if another fluid flows through the first microfluidic channel, the fluid in the first microfluidic channel can merge with the fluid in the capillary break when the fluid in the first microfluidic channel reaches the capillary break opening. After the fluid has passed the capillary break opening, the fluids from both the first microfluidic channel and second microfluidic channel can freely flow in combination as the fluids continue to flow along the first microfluidic channel by capillary action.

Figure 9:
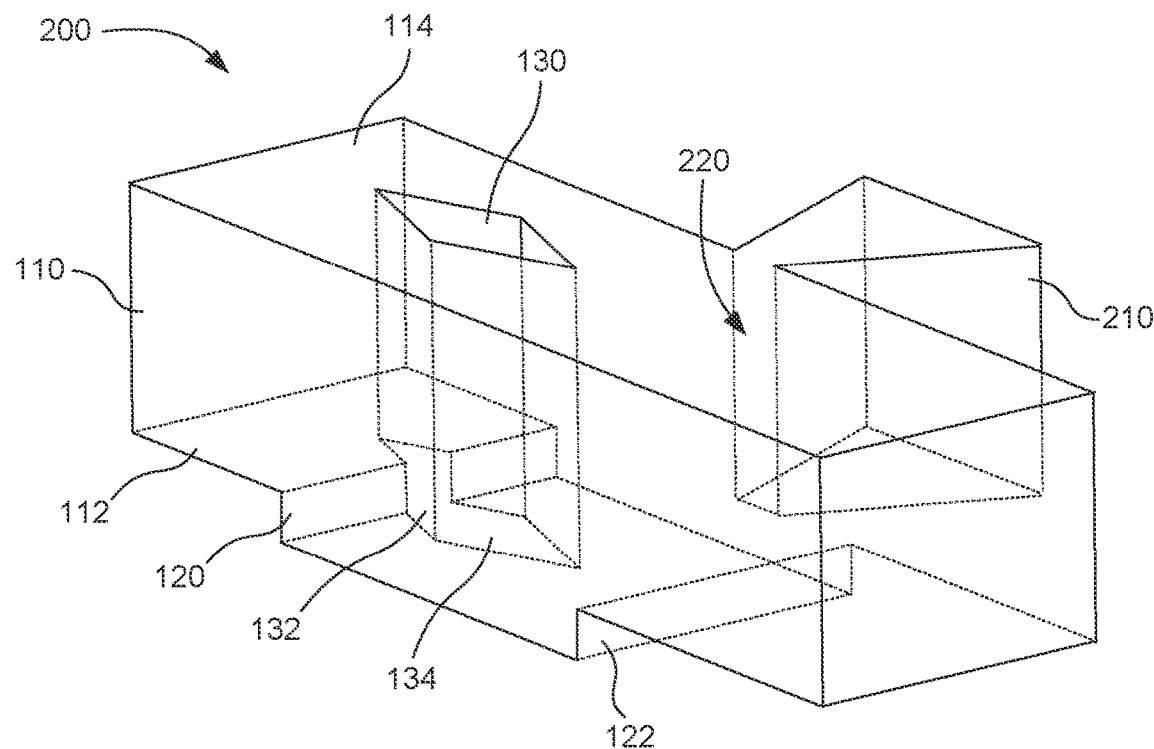
FIG. 9 is a perspective view of an example microfluidic junction in accordance with the present disclosure.

An example self-priming microfluidic junction 200 is shown in FIG. 9. This figure shows a perspective view of the geometry of the microfluidic junction. This example includes a first microfluidic channel 110 that includes a floor 112 and a ceiling 114. The channel height is defined as the distance between the floor and ceiling. A channel height step 120 is in the floor of the first microfluidic channel. An interior pillar 130 extends from the floor to the ceiling and overlaps with the channel height step. The interior pillar includes a widening portion 132 at an upstream end and a tapering portion 134 at a downstream end. A second microfluidic channel 210 joins the first microfluidic channel at a capillary break opening 220 in a wall of the first microfluidic channel. The capillary break opening is positioned downstream of the channel height step. The capillary break opening has a height that is less than the channel height of the first microfluidic channel downstream of the channel height step, i.e., the greater height after the channel height is increased by the channel height step. In this example, the second microfluidic channel includes a tapering portion leading up to the capillary break opening. Thus, the capillary break opening is narrower than the normal width of the second microfluidic channel. The retention pressure of the capillary break opening can be increased by narrowing the second channel in this way. This can make the capillary opening more reliable and able to stop fluid flow until the desired time when the other fluid flows past the capillary opening in the first microfluidic channel. This example also includes a second channel height step 122 where the floor steps up back to its original height.

Figure 10:
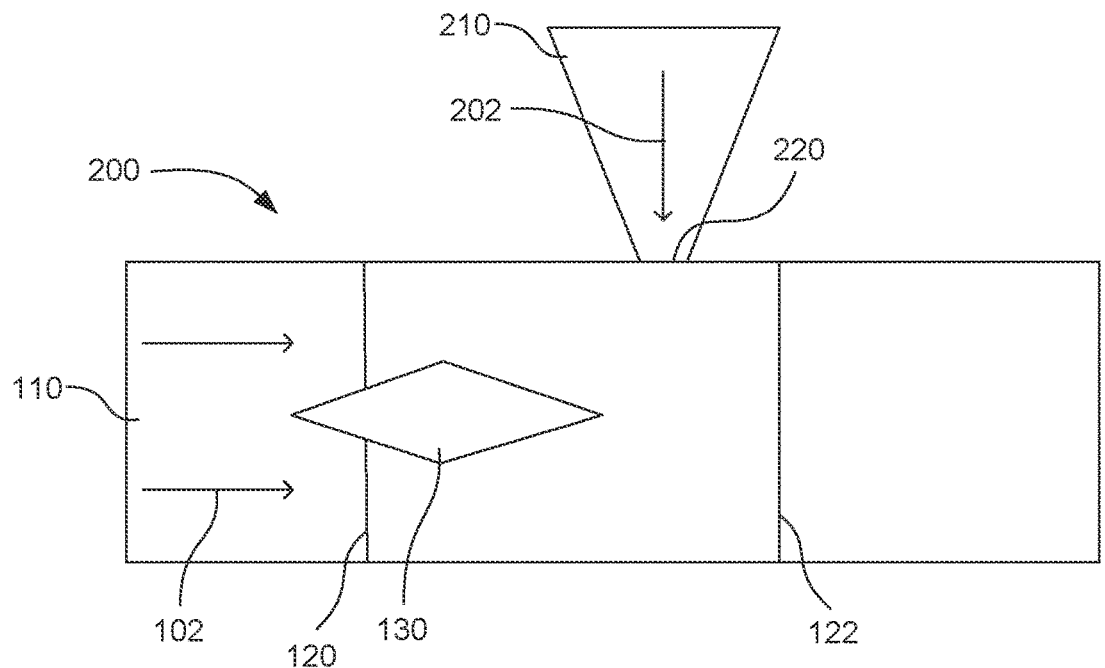
FIG. 10 is a top-down view of the microfluidic junction of FIG. 9.

FIG. 10 shows a top-down view of the same example microfluidic junction 200. The flow direction of fluid through the first microfluidic channel 110 is shown by arrows 102, and the flow direction of fluid through the second microfluidic channel 210 is shown by arrow 202. When this junction is used, fluid can flow through the second microfluidic channel up until the fluid reaches the capillary break opening 220. Because the fluid flows into the second microfluidic channel first, the fluid in the second microfluidic channel can be referred to as the "first fluid." At some later point in time, another fluid can flow through the first microfluidic channel. This fluid can be referred to as the "second fluid" because it flows after the first fluid. When the second fluid reaches the capillary opening, it can join together with the first fluid. In particular, the meniscus of the second fluid and the meniscus of the first fluid can join together. Then, a combination of both fluids can continue to flow along the first microfluidic channel downstream of the capillary break opening. Thus, the junction acts as a type of valve that, at first, stops the first fluid from flowing out of the capillary break opening, but then later allows the first fluid to flow in combination with the second fluid.

As explained above, in some examples the microfluidic structures can be formed from stacked layers of material that include a thin "primer layer," and the channel height step can be present because a cutout is formed in the primer layer. In the case of microfluidic junctions, a cutout may be formed in the primer layer in the location of the capillary break opening. The purpose of the cutout can be to distance the floor of the first microfluidic channel from the capillary opening. This can increase the retention pressure and the reliability of the capillary break opening.

Figure 11A:
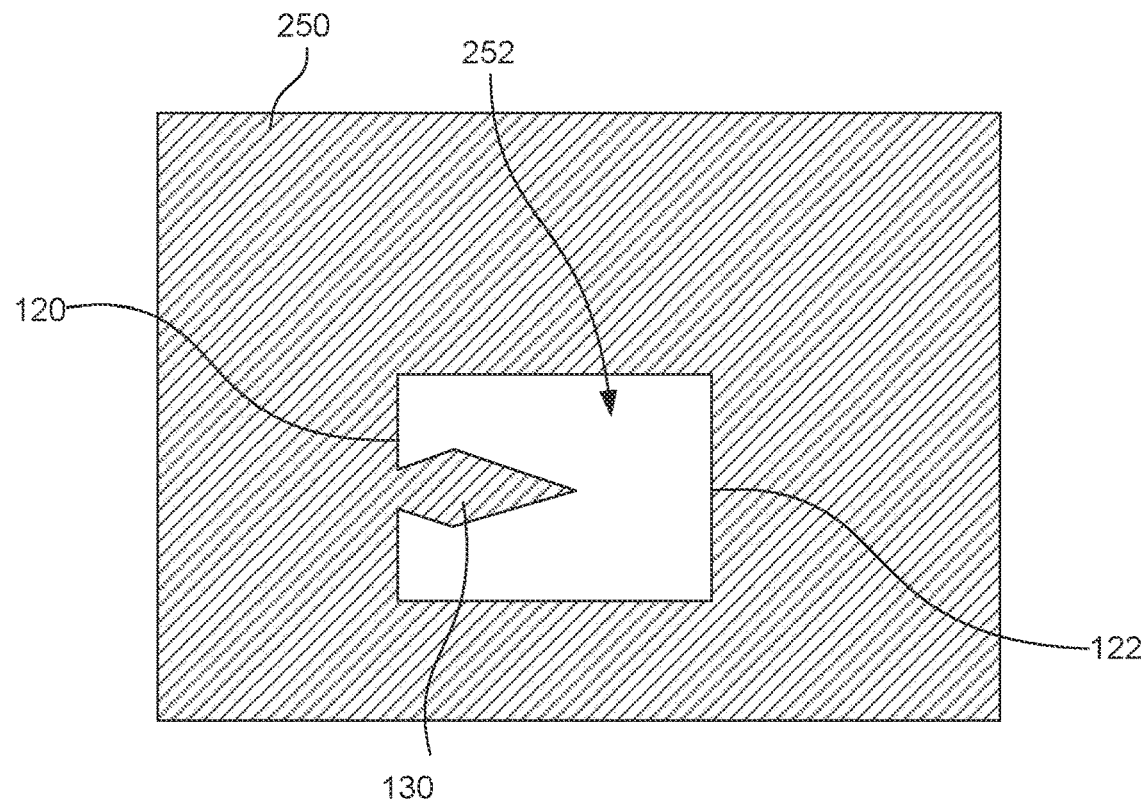
FIGS. 11A and 11B are top-down views of layers of solid material that can be stacked to form the microfluidic junction of FIG. 9.
Figure 11B:
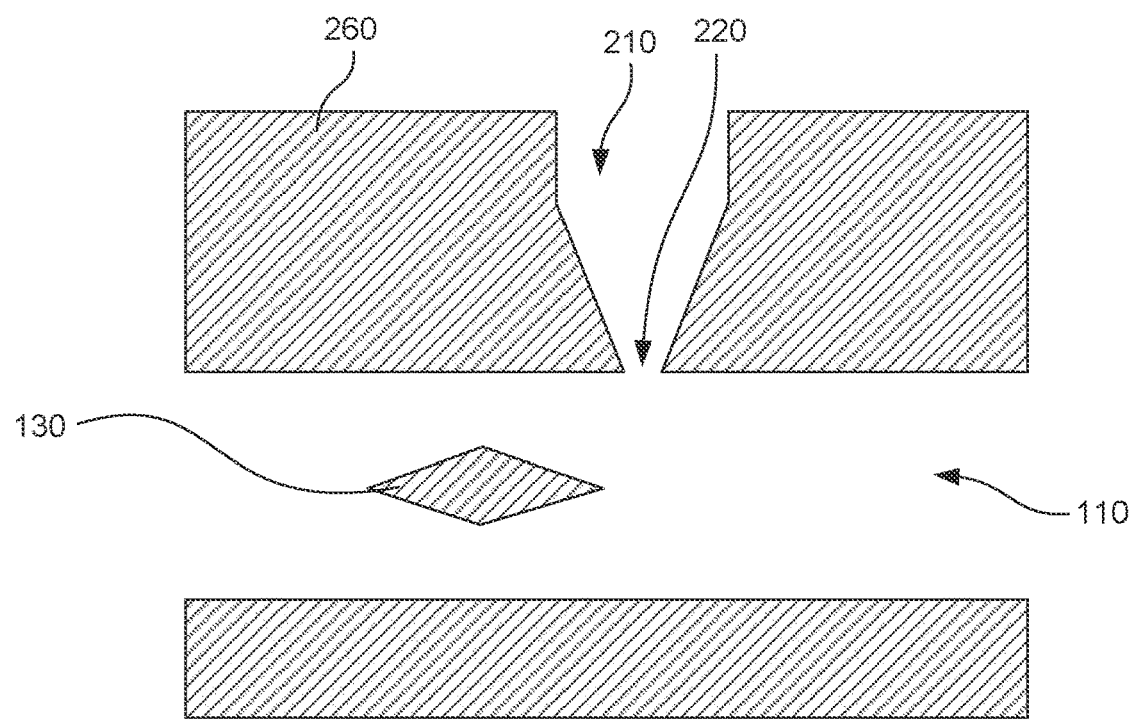

FIGS. 11A and 11B show layers of solid material that can be stacked to make an example self-priming microfluidic junction. FIG. 11A shows a first layer 250 that includes a cutout 252. The upstream edge of the cutout forms the channel height step 120 and the downstream edge of the cutout forms the second channel height step 122. A portion of the interior pillar 130 is also formed from solid material in the cutout. FIG. 11B shows a second layer 260 that includes a void space that forms the first microfluidic channel 110 and the second microfluidic channel 210, with the capillary break opening 220 between the first microfluidic channel and the second microfluidic channel. The interior pillar 130 is also formed of solid material in this layer. The second layer can be stacked on top of the first layer to form an example microfluidic junction as shown in FIG. 9.

Figure 12:
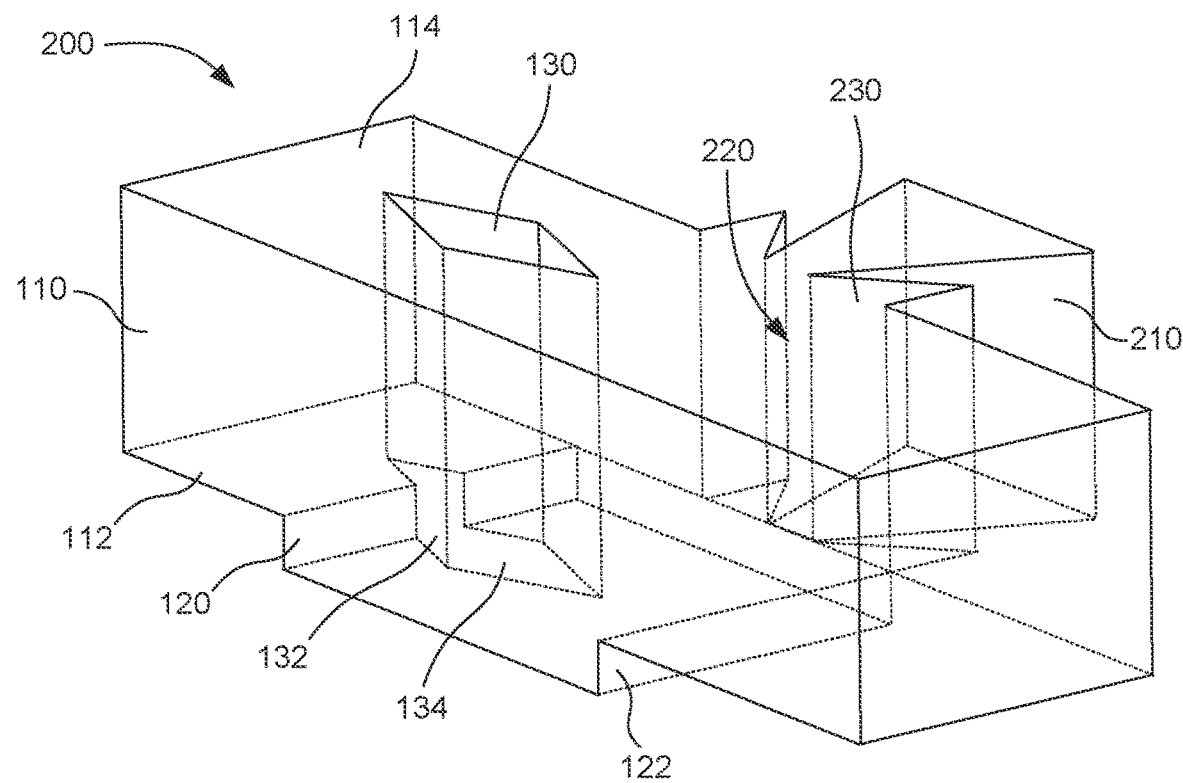
FIG. 12 is a perspective view of another example microfluidic junction in accordance with the present disclosure.

FIG. 12 shows another example self-priming microfluidic junction. This example includes a different design for the capillary break opening 220. The capillary break opening is a narrow opening connecting the second microfluidic channel 210 to the first microfluidic channel 110. In this example, the sidewall of the first microfluidic channel includes angled portions 230 on the sides of the capillary break opening. With these angled wall portions, the solid material of the walls forms a smaller acute angle on the external edges of the capillary break opening. This can further increase the retention pressure of the capillary break opening. This example also includes other features similar to the previous example, including the floor 112, ceiling 114, channel height step 120, second channel height step 122, and an interior pillar 130 with a widening portion 132 and a tapering portion 134.

Figure 13:
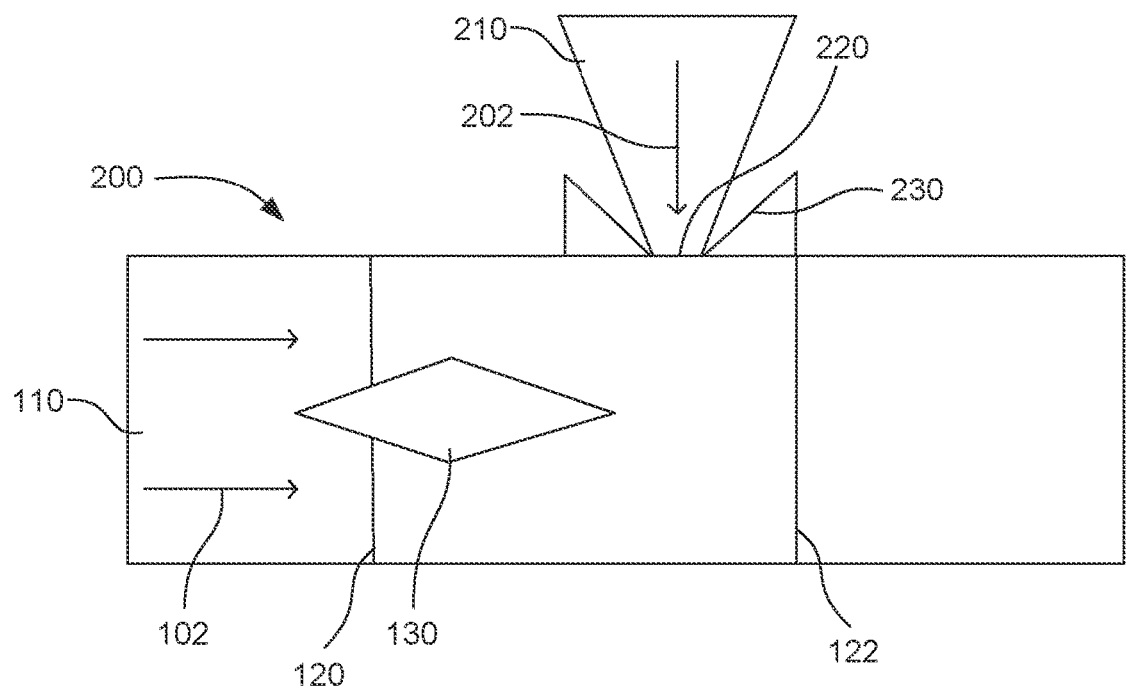
FIG. 13 is a top-down view of the microfluidic junction of FIG. 12.

FIG. 13 shows a top-down view of the example shown in FIG. 12. A first fluid can flow into the second microfluidic channel 210 in the direction shown by arrow 202. The fluid can stop in the capillary break opening 220. This view clearly shows the shape of the angled wall portions 230 on the sides of the capillary break opening. A second fluid can then flow through the first microfluidic channel 110 in the direction shown by arrows 102. The fluid can flow around the interior pillar 130 and over the channel height step 120. The meniscus of the first fluid can merge with the meniscus of the second fluid, and then a combination of both fluids can continue to flow by capillary action along the first microfluidic channel. The fluids can flow over the second channel height step 122, where the cross-sectional area of the channel decreases.

Figure 14A:
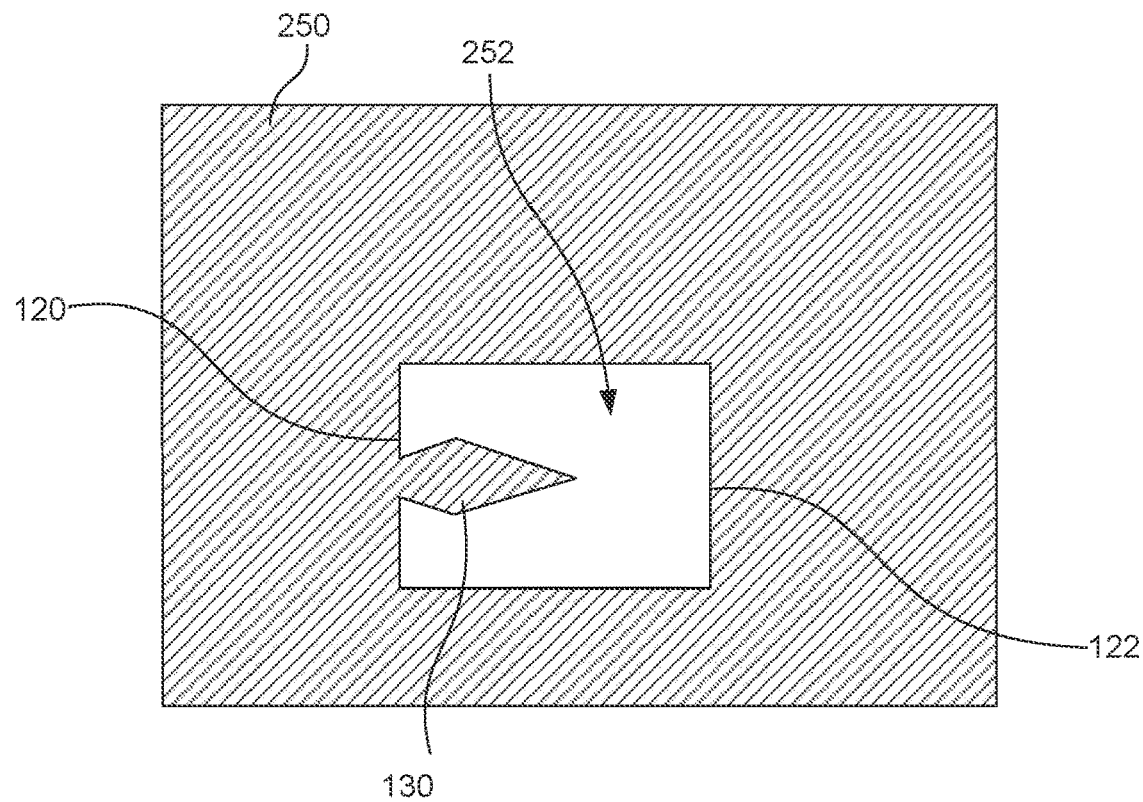
FIGS. 14A and 14B are top-down views of layers of solid material that can be stacked to form the microfluidic junction of FIG. 12.
Figure 14B:
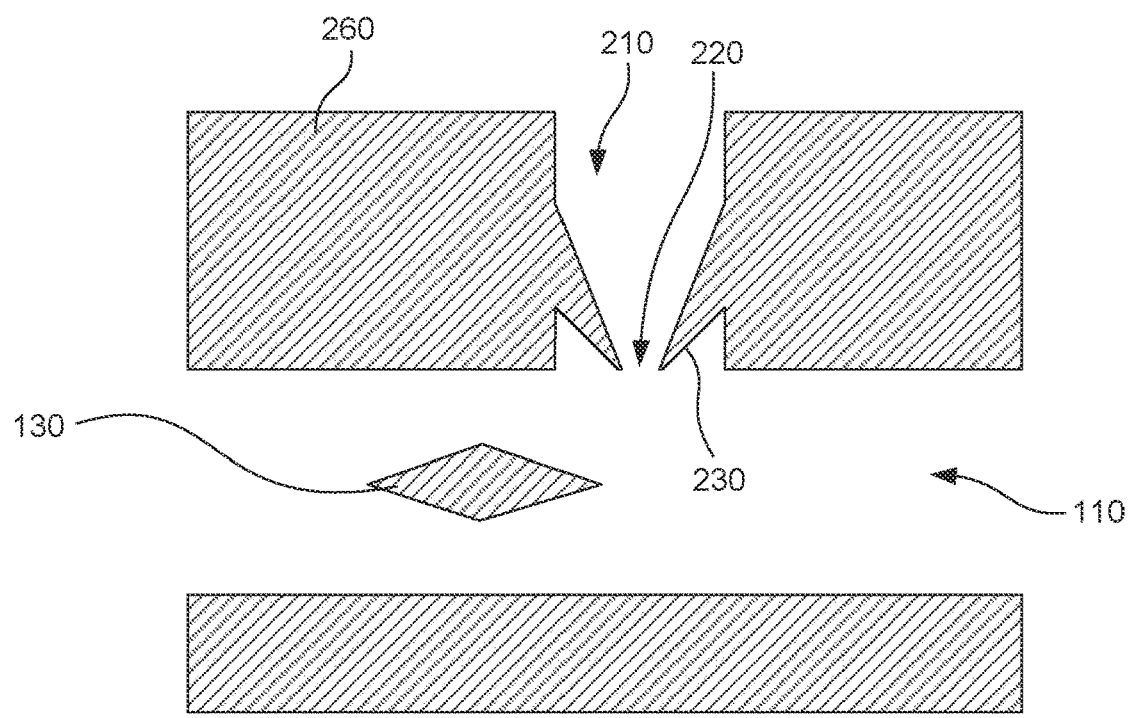

FIGS. 14A and 14B show example layers of solid material that can be stacked to make the microfluidic junction shown in FIGS. 12 and 13. FIG. 14A shows a first layer 250 that includes a cutout 252. The upstream edge of the cutout forms the channel height step 120 and the downstream edge forms the second channel height step 122. A portion of the interior pillar 130 is formed in the solid material. FIG. 14B shows a second layer 260 of solid material that includes a void space forming the first microfluidic channel 110, the second microfluidic channel 210, and the capillary break opening 220. The angled wall portions 230 on the external sides of the capillary break opening are formed as part of the second layer. The second layer also includes a portion of the interior pillar 130 formed from solid material.

Any of the features and characteristics described above with respect to microfluidic structures can also be applied to the microfluidic junctions. Thus, any of the shapes of pillars, dimensions, additional components such as thermal resistors, angled sidewalls, and so on, can also be applied to the microfluidic junctions.

Methods of Priming a Microfluidic Structure

Figure 15:
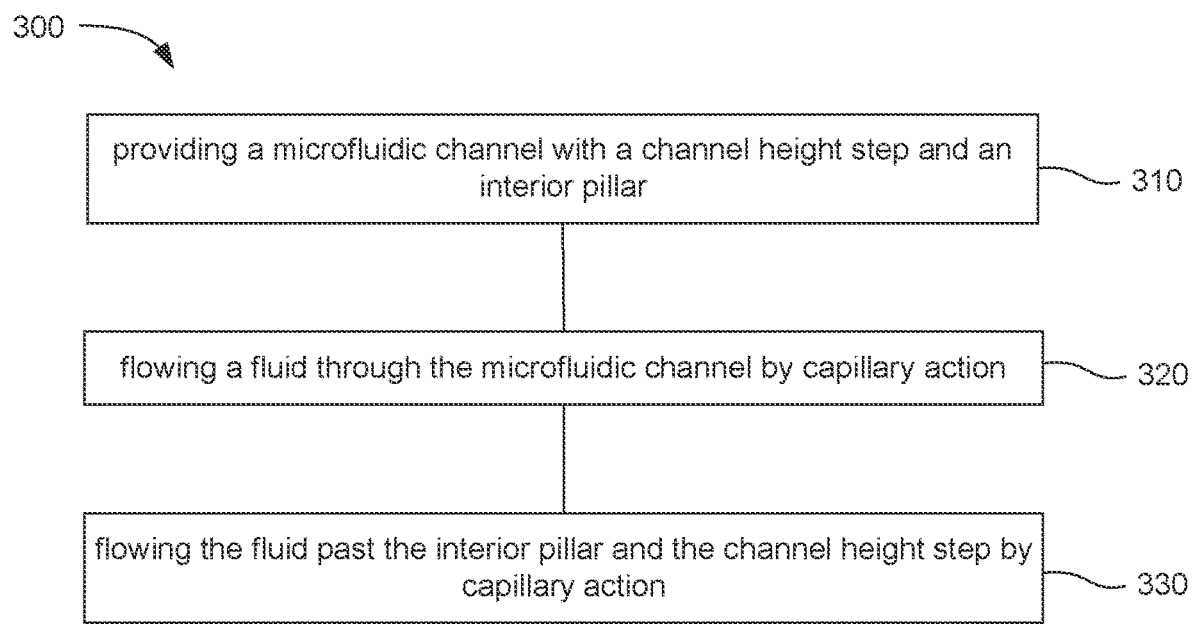
FIG. 15 is a flowchart illustrating an example method of priming a microfluidic structure in accordance with the present disclosure.

The present disclosure also describes methods of priming a microfluidic structure. The microfluidic structure can have any of the features of microfluidic structures or junctions described herein. FIG. 15 is a flowchart illustrating an example method of priming a microfluidic structure 300. This method includes: providing a microfluidic channel including a floor and a ceiling, wherein a channel height is defined as a distance between the floor and the ceiling, wherein the channel height increases, in a fluid flow direction through the microfluidic channel, at a channel height step in the floor, or ceiling, or both, wherein an interior pillar is positioned in the microfluidic channel and extends from the floor to the ceiling, wherein the interior pillar includes a widening portion at an upstream end of the interior pillar and a tapering portion at a downstream end of the interior pillar, wherein the interior pillar overlaps the channel height step such that the interior pillar is partially upstream of the channel height step and partially downstream of the channel height step 310; flowing a fluid through the microfluidic channel in the fluid flow direction by capillary action 320; and flowing the fluid past the interior pillar and the channel height step by capillary action 330.

As mentioned above, the microfluidic structures described herein can be particularly useful when used with a high-contact-angle fluid. In some examples, the fluid that is used to prime the microfluidic structure can have a contact angle of 70° or greater with the material of the microfluidic channel walls. Some example fluids that may have a high contact angle include pure water, reagents, biological components such as dispersions of live cells, surfactant-free dispersions, and others.

In further examples, the method of priming can include joining two fluids at a junction as described above. A first fluid can first flow through a second microfluidic channel. The second microfluidic channel can connect to a first microfluidic channel through a capillary break opening. The first fluid can flow to the capillary break opening and then stop at the capillary break opening, forming a meniscus. A second fluid can then flow through the first microfluidic channel. The first microfluidic channel can include the interior pillar and channel height step described above. The meniscus of the second fluid can proceed through the first microfluidic channel until it reaches the capillary break opening. The meniscus of the second fluid can then merge with the meniscus of the first fluid. After the fluids merge, a combination of both fluids can flow through the microfluidic channel downstream of the capillary break opening.

It is to be understood that this disclosure is not limited to the particular processes and materials disclosed herein because such processes and materials may vary somewhat. It is also to be understood that the terminology used herein is used for the purpose of describing particular examples. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though members of the list are individually identified as a separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if the numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLE

Self-Priming Microfluidic Device with Multiple Junctions

Figure 16:
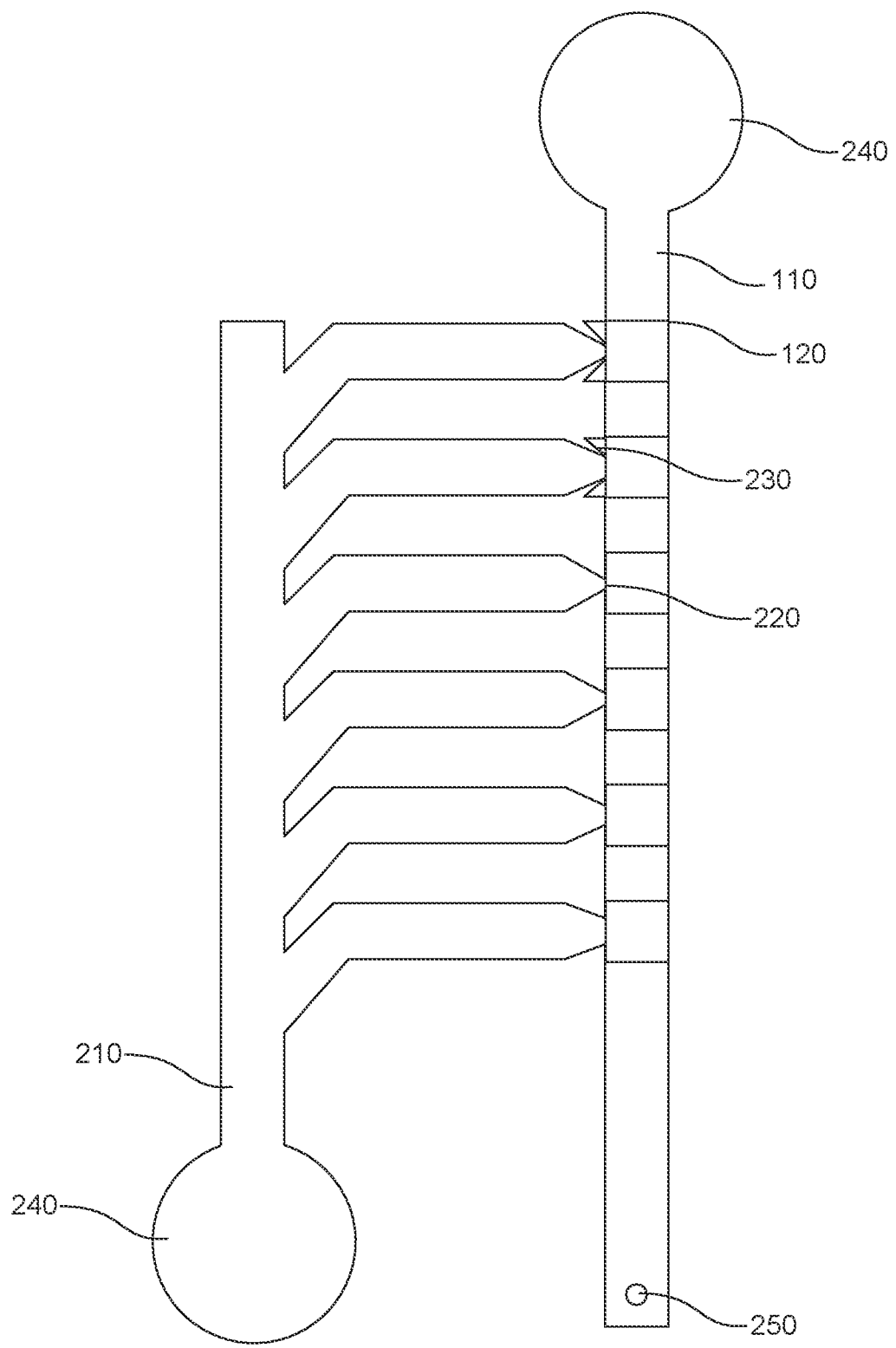
FIG. 16 is a top-down view of a comparative microfluidic device.
Figure 17:
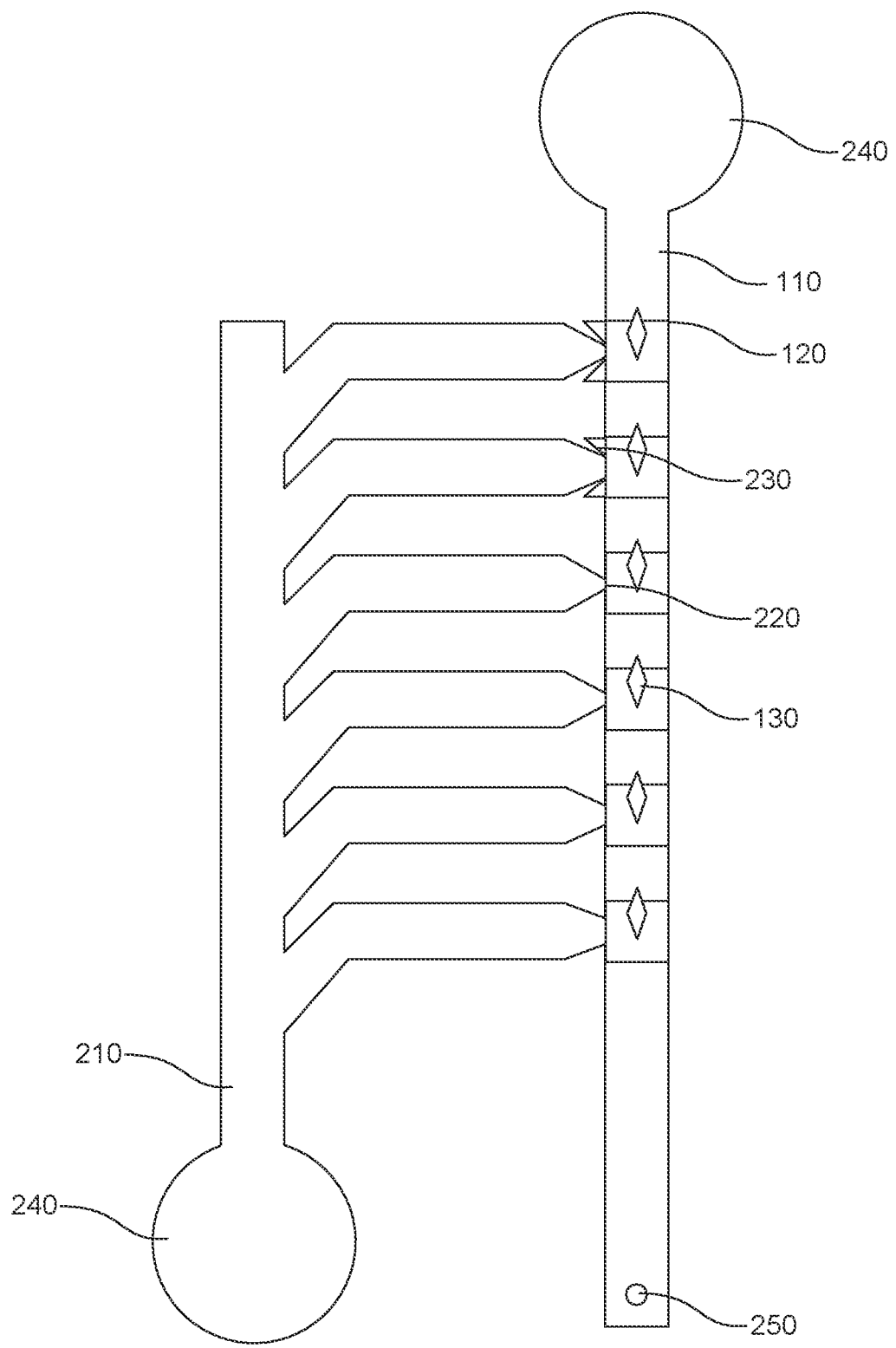
FIG. 17 is a top-down view of an example microfluidic device in accordance with the present disclosure.
Figure 18:
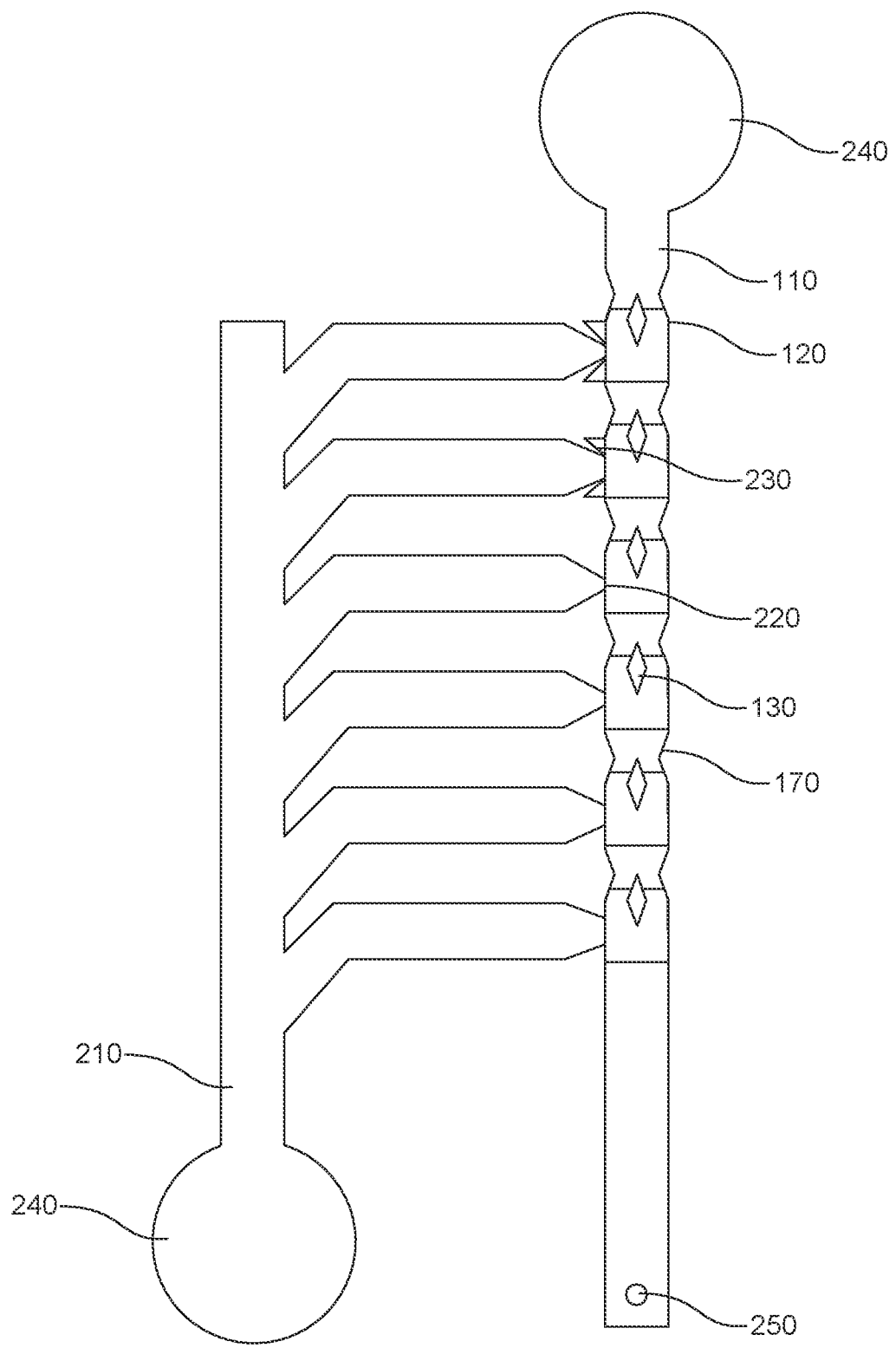
FIG. 18 is a top-down view of another example microfluidic device in accordance with the present disclosure.

A series of three microfluidic devices were designed and fabricated as shown in FIGS. 16-18. The devices included a substrate, a primer layer of SU-8 photoresist on the substrate, a microfluidic layer made from a thicker layer of SU-8 over the primer layer, and a top cap layer over the microfluidic layer. The devices included a first microfluidic channel 110 which was formed in the microfluidic layer, and which also included 6 rectangular cutouts in the primer layer. Therefore, there were six channel height steps 120 that increased the cross-sectional area of the first microfluidic channel. The devices also included a second microfluidic channel 210. The second microfluidic channel branched into six separate channels that connected to the first microfluidic channel at six capillary break openings 220. The capillary break openings were positioned over the primer layer cutouts. The capillary break openings had different designs so that six different capillary break openings were tested in the devices. The six different capillary break opening designs included: a 15 μm-wide opening, a 10 μm-wide opening, an 8 μm-wide opening, a 5 μm-wide opening, a 15 μm-wide opening with angled sidewall portions 230 on the external sides of the capillary break opening, and a 5 μm-wide opening with angled sidewall portions on the external sides of the capillary break opening. The devices also included two fluid reservoirs 240, one for a first fluid that would be introduced into the second microfluidic channel, and one for a second fluid that would be introduced into the first microfluidic channel. A vent hole 250 was placed at the end of the first microfluidic channel to allow air to escape as liquid fills the channels. Vent holes can be placed along the first microfluidic channel and the second microfluidic channel so that air can be vented as the channels are primed with liquid.

FIG. 16 shows a top-down view of the design of one of the microfluidic devices. This device is a comparative device because it does not include interior pillars overlapping with the channel height steps at the primer layer cutouts.

FIG. 17 shows a top-down view of the design of an example microfluidic device according to the present disclosure. This device includes interior pillars 130 overlapping the channel height steps, according to the description provided above. The interior pillars were diamond shaped, with a wedge-shaped upstream end having an angle of 40°, and a downstream tapering end also having an angle of 40°. The length of the pillars was 55 μm and the width of the pillars was 20 μm.

FIG. 18 shows a top-down view of the design of another example microfluidic device according to the present disclosure. This device includes the interior pillars 130 and also includes angled sidewall portions 170 that reduce the width of the first microfluidic channel at the channel height steps. The interior pillars had the same dimensions as in FIG. 17. The angled sidewall portions had a wall portion forming an angle of 10° with the sidewall at the upstream end and the downstream end. The angled sidewall portions extended 10 μm into the microfluidic channel and were 55 μm long.

The devices of FIGS. 16-18 were fabricated and tested. First, a first fluid was loaded by pipette into the reservoir leading to the second microfluidic channel. The fluid flowed by capillary action along the second microfluidic channel and into the six branches. The fluid continued to flow until it reached the capillary break openings. After fluid had reached all six capillary break openings, the flow of the first fluid stopped. This occurred in the same way for all three of the devices. Next, a second fluid was loaded by pipette into the reservoir connected to the first microfluidic channel. In the case of the device of FIG. 16, the second fluid flowed by capillary action until it reached the first channel height step (at the upstream end of the first primer layer cutout). The fluid stopped at the first channel height cutout and no more fluid flow occurred. However, in the devices of FIG. 17 and FIG. 18, the second fluid flowed by capillary action to the first channel height step, and the fluid flowed around the interior pillar and over the channel height step. The fluid then merged with the first fluid meniscus in the capillary break opening. The combined fluids continued to flow by capillary action through the first microfluidic channel, and successfully primed all of the junctions.

These results show that the six capillary break opening designs used in the test devices can successfully stop the flow of fluid from the second microfluidic channel until another fluid is introduced in the first microfluidic channel and the fluids merge together. Additionally, these results show that the primer cutouts stop the flow of the fluid through the first microfluidic channel if the interior pillars are not present. The results from the devices of FIG. 17 and FIG. 18 show that including the interior pillars or a combination of interior pillars and angled sidewall segments can allow fluid to prime the entire device by capillary action.

While the present technology has been described with reference to certain examples, various modifications, changes, omissions, and substitutions can be made without departing from the disclosure. It is intended, therefore, that the disclosure be limited by the scope of the following claims.

What is claimed is:

1. A self-priming microfluidic structure, comprising:
   a microfluidic channel comprising a floor and a ceiling, wherein a channel height is defined as a distance between the floor and the ceiling;
   a channel height step in the floor, or ceiling, or both, wherein the channel height downstream of the channel height step is greater than the channel height upstream of the channel height step; and
   an interior pillar positioned in the microfluidic channel and extending from the floor to the ceiling, wherein the interior pillar comprises a widening portion at an upstream end of the interior pillar and a tapering portion at a downstream end of the interior pillar, wherein the interior pillar overlaps the channel height step such that the interior pillar is partially upstream of the channel height step and partially downstream of the channel height step.

2. The self-priming microfluidic structure of claim 1, wherein the widening portion of the interior pillar overlaps the channel height step such that the widening portion is partially upstream of the channel height step and partially downstream of the channel height step.

3. The self-priming microfluidic structure of claim 2, wherein the widening portion of the interior pillar has a wedge shape with an upstream edge having an angle from 1° to 160°.

4. The self-priming microfluidic structure of claim 1, wherein the tapering portion of the interior pillar has a tapered downstream edge having an angle from 5° to 45°.

5. The self-priming microfluidic structure of claim 1, wherein the microfluidic channel comprises an angled sidewall portion that reduces a channel width of the microfluidic channel at the channel height step compared to the channel width of the microfluidic channel upstream of the angled sidewall portion.

6. The self-priming microfluidic structure of claim 1, further comprising a thermal resistor on the floor downstream of the channel height step.

7. The self-priming microfluidic structure of claim 1, wherein the microfluidic channel is formed in multiple stacked layers of photoresist material, wherein the channel height step comprises a layer of the multiple stacked layers having a void space formed therein downstream of the channel height step, wherein the layer is solid upstream of the channel height step, and wherein the layer is the floor or ceiling of the microfluidic channel upstream of the channel height step.

8. A self-priming microfluidic junction, comprising:
   a first microfluidic channel comprising a floor and a ceiling, wherein a channel height is defined as a distance between the floor and ceiling;
   a channel height step in the floor, or ceiling, or both, wherein the channel height downstream of the channel height step is greater than the channel height upstream of the channel height step;
   an interior pillar positioned in the first microfluidic channel and extending from the floor to the ceiling, wherein the interior pillar comprises a widening portion at an upstream end of the interior pillar and a tapering portion at a downstream end of the interior pillar, wherein the interior pillar overlaps with channel height step such that the interior pillar is partially upstream of the channel height step and partially downstream of the channel height step; and
   a second microfluidic channel joining the first microfluidic channel at a capillary break opening in a wall of the first microfluidic channel, wherein the capillary break opening is positioned downstream of the channel height step, and wherein the capillary break opening has a height that is less than the channel height of the first microfluidic channel downstream of the channel height step.

9. The self-priming microfluidic junction of claim 8, wherein the widening portion of the interior pillar overlaps the channel height step such that the widening portion is partially upstream of the channel height step and partially downstream of the channel height step.

10. The self-priming microfluidic junction of claim 9, wherein the widening portion of the interior pillar has a wedge shape with an upstream edge having an angle from 1° to 160°, and wherein the tapering portion of the interior pillar has a tapered downstream edge having an angle from 5° to 45°.

11. The self-priming microfluidic junction of claim 8, wherein the first microfluidic channel comprises an angled sidewall portion that reduces a channel width of the first microfluidic channel at the channel height step compared to the channel width of the first microfluidic channel upstream of the angled sidewall portion.

12. The self-priming microfluidic junction of claim 8, wherein the first microfluidic channel and the second microfluidic channel are formed in multiple stacked layers of photoresist material, wherein the channel height step comprises a layer of the multiple stacked layers having a void space formed therein downstream of the channel height step, wherein the layer is solid upstream of the channel height step, and wherein the layer is the floor or ceiling of the first microfluidic channel upstream of the channel height step.

13. A method of priming a microfluidic structure, comprising:
   providing a microfluidic channel comprising a floor and a ceiling, wherein a channel height is defined as a distance between the floor and the ceiling, wherein the channel height increases, in a fluid flow direction through the microfluidic channel, at a channel height step in the floor, or ceiling, or both, wherein an interior pillar is positioned in the microfluidic channel and extends from the floor to the ceiling, wherein the interior pillar comprises a widening portion at an upstream end of the interior pillar and a tapering portion at a downstream end of the interior pillar, wherein the interior pillar overlaps the channel height step such that the interior pillar is partially upstream of the channel height step and partially downstream of the channel height step;
   flowing a fluid through the microfluidic channel in the fluid flow direction by capillary action; and
   flowing the fluid past the interior pillar and the channel height step by capillary action.

14. The method of claim 13, wherein the microfluidic channel is a first microfluidic channel and wherein the fluid is a second fluid, and wherein the method further comprises introducing a first fluid into a second microfluidic channel, wherein the second microfluidic channel joins the first microfluidic channel at a capillary break opening in a wall of the first microfluidic channel, wherein the capillary break opening is positioned downstream of the channel height step, and wherein the capillary break opening has a height that is less than the channel height of the first microfluidic channel downstream of the channel height step;

flowing the first fluid through the second microfluidic channel by capillary action;

stopping the first fluid in the capillary break opening, wherein the first fluid forms a meniscus at the capillary break opening before the second fluid flows past the channel height step;

merging the second fluid with the meniscus of the first fluid as the second fluid flows past the capillary break opening; and flowing a combination of the first fluid and the second fluid, by capillary action, through the first microfluidic channel downstream of the capillary break opening.

15. The method of claim 13, wherein the fluid has a contact angle greater than 70° with a material of the floor, ceiling, or walls of the first microfluidic channel.

* * * * *